(12) United States Patent
Jin et al.

(10) Patent No.: US 10,439,246 B2
(45) Date of Patent: Oct. 8, 2019

(54) ELECTRODE STRUCTURE, METHOD FOR MANUFACTURING THEREOF AND USE THEREOF, AND STACK STRUCTURE OF REDOX FLOW BATTERY

(71) Applicant: KOREA INSTITUTE OF ENERGY RESEARCH, Daejeon (KR)

(72) Inventors: Chang-soo Jin, Sejong-si (KR); Kyoung-hee Shin, Daejeon (KR); Sun-hwa Yeon, Sejong-si (KR); Bum-suk Lee, Daejeon (KR); Sea Couk Park, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 132 days.

(21) Appl. No.: 15/482,203

(22) Filed: Apr. 7, 2017

(65) Prior Publication Data
US 2017/0294658 A1    Oct. 12, 2017

(30) Foreign Application Priority Data

Apr. 8, 2016    (KR) .................. 10-2016-0043576

(51) Int. Cl.
| | | |
|---|---|---|
| *H01M 4/66* | (2006.01) | |
| *H01M 4/80* | (2006.01) | |
| *H01M 8/18* | (2006.01) | |
| *H01M 4/86* | (2006.01) | |
| *H01M 8/023* | (2016.01) | |

(52) U.S. Cl.
CPC ......... *H01M 8/188* (2013.01); *H01M 4/8605* (2013.01); *H01M 4/8668* (2013.01); *H01M 4/8673* (2013.01); *H01M 8/023* (2013.01); *Y02E 60/528* (2013.01)

(58) Field of Classification Search
CPC ............. H01M 4/8605; H01M 4/8668; H01M 4/8673; H01M 8/023; H01M 8/188; Y02E 60/528
See application file for complete search history.

(56) References Cited

FOREIGN PATENT DOCUMENTS

| JP | 2001-196071 A | 7/2001 |
| JP | 2002231271 A | 8/2002 |
| JP | 2015-213074 | * 11/2015 |
| JP | 2015213074 A | 11/2015 |
| KR | 1020130054548 A | 5/2013 |
| KR | 10-1309262 B1 | 9/2013 |
| KR | 10-1498597 B1 | 3/2015 |

OTHER PUBLICATIONS

English translation of JP Publication 2015-213074, Nov. 2015.*

* cited by examiner

*Primary Examiner* — Brittany L Raymond
(74) *Attorney, Agent, or Firm* — Sughrue Mion, PLLC

(57) ABSTRACT

This invention relates to an electrode structure including a porous electrode that simultaneously performs the functions both of a bipolar plate and of a felt electrode and has a pattern layer or a mesh layer serving as a flow path on the surface thereof, a method of manufacturing the same, and a redox flow battery stack configuration for decreasing shunt current.

13 Claims, 14 Drawing Sheets

ELECTRODE STRUCTURE, METHOD FOR MANUFACTURING THEREOF AND USE THEREOF, AND STACK STRUCTURE OF REDOX FLOW BATTERY

CROSS-REFERENCE TO RELATED APPLICATION

This application claims the benefit of Korean Patent Application No. 10-2016-0043576, filed on Apr. 8, 2016 in the Korean Intellectual Property Office, the disclosures of which are incorporated herein by reference.

BACKGROUND OF THE INVENTION

1. Technical Field

The present invention relates to an electrode structure, a method of manufacturing the same, the use thereof, and a redox flow battery stack configuration. More particularly, the present invention relates to an electrode structure, a method of manufacturing the same, the use thereof, and a redox flow battery stack configuration, wherein the electrode structure is configured to include a porous electrode having a pattern layer or a mesh layer functioning as a flow path on the surface thereof, the porous electrode being able to simultaneously perform the functions both of a bipolar plate and of a felt electrode, and the redox flow battery stack configuration is able to decrease shunt current.

2. Description of the Related Art

Typically useful as a secondary battery for large power storage, a redox flow battery (RFB) is receiving attention because the maintenance cost thereof is low, it may be operated at room temperature, and the capacity and power may be designed independently, and thus thorough research into the use thereof as a large-capacity secondary battery is ongoing.

Generally, a redox flow battery is configured to include a positive electrode, a negative electrode, a bipolar plate and a separator, which are collectively referred to as a unit cell. Such a unit cell may be used by being stacked in a plural number so as to be suitable for a power design.

As illustrated in FIGS. 1A and 1B, respectively showing a schematic view and a cross-sectional view of a conventional redox flow battery, it includes a unit structure comprising current collectors 2 respectively provided inside a pair of end plates 1 including an electrolyte solution inlet and an electrolyte solution outlet located at the outermost positions, a bipolar plate 10 fixed to a frame 11, manifolds 21, 22 including felt electrodes 25, and a separator 30, and the unit structure may be repeatedly stacked in series and/or parallel. Specifically, as shown in FIG. 1B, the unit structure is configured such that the first manifold 21 and the second manifold 22 including the felt electrodes 25 with different polarities are disposed on both sides of the separator 30, and the bipolar plate 10 fixed to the frame 11 is formed on the outside of the two manifolds.

Such a conventional redox flow battery is configured such that the first manifold 21 including a felt electrode and the bipolar plate and the second manifold 22 including a felt electrode having a different polarity are repeatedly stacked on both sides of the separator 30, and thus the volume of the resulting stack may increase and expensive materials may be used in large amounts, undesirably increasing manufacturing costs and the stacking time.

Hence, Japanese Patent Application Publication No. 2001-196071 discloses a stacking method in which a carbon fiber electrode and a bipolar plate are bonded while coming into pressure contact with each other, without the use of an additional binder, in order to decrease interfacial resistance of the stack to thus increase power characteristics and facilitate stacking.

As prior patents of the present inventors, Korean Patent No. 10-1309262 discloses an integrated complex electrode cell and a redox flow battery including the same, in which the volume of the redox flow battery stack is decreased, stacking efficiency is increased, and stacking time and costs may be drastically decreased, and Korean Patent No. 10-1498597 discloses a technique for bonding an electrode and a bipolar plate by means of a thermosetting contact sheet in order to decrease the interfacial resistance of cells.

However, the above methods are problematic because initial cell resistance is high and the bipolar plate may corrode or deteriorate due to the use of a strong acid upon long-term use thereof, making it difficult to maintain the bonding of the bipolar plate and the electrode. Furthermore, in the case where the thermosetting contact sheet is used, interfacial resistance may increase due to the presence of an additional interface, and in the case where the electrode including the felt electrode and the bipolar plate in the vanadium-based redox flow battery is used, it is difficult to decrease the volume of the stack, undesirably lowering the stack power density.

Moreover, in the configuration of the redox flow battery, the electrolyte solution inlet is positioned at the outermost end plate, and in the range of the outermost electrolyte solution inlet to the outlet, the transfer distance of the electrolyte solution may be lengthened with an increase in the number of cells that are stacked. As the transfer distance of the electrolyte solution is lengthened, voltage distribution and internal current dropping may occur.

CITATION LIST

Patent Literature

Japanese Patent Application Publication No. 2001-196071
Korean Patent No. 10-1309262
Korean Patent No. 10-1498597

SUMMARY OF THE INVENTION

Accordingly, the present invention has been made keeping in mind the problems encountered in the related art, and the present invention is intended to provide an electrode structure and a method of manufacturing the same, in which the electrode structure includes, as an integrated porous electrode that is able to simultaneously perform the functions both of a bipolar plate and of a felt electrode, a porous electrode having a pattern layer or a mesh layer able to function as a flow path on the surface thereof. In addition, the present invention is intended to provide a redox flow battery stack configuration that is able to decrease shunt current.

Therefore, the present invention provides a porous electrode, comprising a porous conductor and a binder and having a pattern layer or a mesh layer formed on at least one surface thereof.

The porous electrode is able to simultaneously perform the functions both of a bipolar plate and of a felt electrode.

In addition, the present invention provides an electrode structure, comprising a positive electrode, a negative electrode disposed so as to face the positive electrode, and a separator disposed between the positive electrode and the negative electrode, wherein at least one of the positive electrode and the negative electrode is a porous electrode comprising a porous conductor and a binder. Here, the porous electrode may have a pattern layer or a mesh layer formed on at least one surface thereof.

The porous electrode and the separator may be bonded to each other and thus provided in an integrated form.

The porous electrode is able to simultaneously perform the functions both of a bipolar plate and of a felt electrode in the flow battery.

The porous conductor may comprise a first conductive material, having a porous structure, and a second conductive material including at least one selected from the group consisting of a carbon-based material, a metal, and a metal coated with a carbon-based material.

The first conductive material is a porous material having a specific surface area of 1 $m^2/g$ or more, and preferably 500 $m^2/g$ to 3000 $m^2/g$.

The first conductive material may include a carbon-based material.

The carbon-based material may include any one or a mixture of two or more selected from the group consisting of activated carbon, graphite, carbon black, acetylene black, Denka black, Ketjen black, mesoporous carbon, graphene, a carbon nanotube, a carbon nanofiber, a carbon nanohorn, a carbon nanoring, a carbon nanowire, and fullerene.

The second conductive material may include at least one selected from the group consisting of: a carbon-based material including any one or a mixture of two or more selected from the group consisting of activated carbon, graphite, carbon black, acetylene black, Denka black, Ketjen black, mesoporous carbon, graphene, a carbon nanotube, a carbon nanofiber, a carbon nanohorn, a carbon nanoring, a carbon nanowire, and fullerene; a metal including a single metal or a metal alloy of two or more selected from the group consisting of Cu, Al, Ti, Au, Pt, Fe, Ag, Si, Sn, Bi, Mg, Zn, In, Ge and Pb; and a metal coated with a carbon-based material.

The binder may include at least one selected from the group consisting of polytetrafluoroethylene (PTFE), polyvinylidene fluoride (PVDF), carboxymethylcellulose (CMC), polyvinyl alcohol (PVA), polyvinyl butyral (PVB), polyvinyl pyrrolidone (PVP), polyethylene (PE), molasses, and styrene butadiene rubber (SBR).

The porous electrode may comprise, based on the total weight of the porous electrode, 40 to 90 wt % of the first conductive material, 0.3 to 30 wt % of the second conductive material, and 1 to 30 wt % of the binder.

The pattern layer may include a patterned portion and a non-patterned portion, wherein the patterned portion includes a pattern having at least one recess or at least one protrusion, the non-patterned portion is provided so as to be close to the outside of the porous electrode, and the patterned portion is provided so as to be close to the inside of the porous electrode.

The shape of the horizontal cross-section of the recess or protrusion may be selected from the group consisting of a circular shape and a polygonal shape.

The pattern closest to the non-patterned portion may have a thickness of 0.5 times to less than 1 times or of 2 times or less but exceeding 1 times the thickness of the non-patterned portion.

The non-patterned portion may have a width variation of zero.

The porous electrode may have a thickness of 0.01 mm to 2 mm.

The pattern layer or the mesh layer may be used as a flow path of an electrolyte solution.

The electrode structure may have a thickness of 0.025 mm to 5 mm.

The distance between the porous electrode and the separator may be 0 to 3 mm.

In addition, the present invention provides a method of manufacturing a porous electrode, comprising mixing a porous conductor and a binder to give a slurry, forming the slurry into a film through casting or rolling and then drying the film, and forming a pattern layer or a mesh layer on at least one surface of the dried film. Here, the porous electrode may be an integrated electrode that simultaneously performs the functions both of a bipolar plate and of a felt electrode.

In addition, the present invention provides a method of manufacturing an electrode structure, comprising forming a positive electrode, forming a negative electrode so as to face the positive electrode, and forming a separator between the positive electrode and the negative electrode, wherein at least one of the positive electrode and the negative electrode is manufactured by mixing a porous conductor and a binder to give a slurry (step a), forming the slurry into a film through casting or rolling and then drying the film (step b), and forming a pattern layer or a mesh layer on at least one surface of the dried film (step c).

The slurry may comprise, based on the total weight of the slurry, 30 to 70 wt % of the first conductive material, 0.2 to 25 wt % of the second conductive material, 3 to 25 wt % of the binder, and the remainder of a solvent.

Step b may be performed by subjecting the slurry to casting or rolling on a graphite plate and a conductive plate.

Step c may be performed using roll pressing, compression, or printing.

Step c may be performed in a manner in which a pattern layer including at least one recess or at least one protrusion is formed.

In addition, the present invention provides an electrochemical device, comprising an electrode structure configured to include a positive electrode, a negative electrode disposed so as to face the positive electrode, and a separator disposed between the positive electrode and the negative electrode, wherein at least one of the positive electrode and the negative electrode is a porous electrode comprising a porous conductor and a binder, and the porous electrode has a pattern layer or a mesh layer formed on at least one surface thereof.

The electrochemical device may be an aqueous or organic redox flow battery, a fuel cell, a flow capacitor, or a salinity gradient power generator.

The detailed description of the electrode structure is the same as above.

Furthermore, the present invention provides a redox flow battery, comprising a pair of end plates having an electrolyte solution inlet and an electrolyte solution outlet, current collectors respectively disposed inside the end plates, and an electrode structure disposed between the current collectors. Here, the electrode structure includes a positive electrode, a negative electrode disposed so as to face the positive electrode, and a separator disposed between the positive electrode and the negative electrode, and at least one of the positive electrode and the negative electrode may be a porous electrode comprising a porous conductor and a binder and having a pattern layer or a mesh layer formed on at least one surface thereof. The detailed description of the electrode structure is the same as above.

In addition, the present invention provides a porous electrode, which is an integrated porous electrode that simultaneously performs the functions both of a bipolar plate and of a felt electrode in a redox flow battery, and the porous electrode is composed of a porous conductor and a binder and has a pattern layer or a mesh layer formed on at least one surface thereof. The detailed description of the porous electrode is the same as the above description in the electrode structure.

Also, the present invention provides a method of manufacturing an integrated porous electrode that simultaneously performs the functions both of a bipolar plate and of a felt electrode in a redox flow battery, comprising mixing a porous conductor and a binder to give a slurry, forming the slurry into a film through casting or rolling and then drying the film, and forming a pattern layer or a mesh layer on at least one surface of the dried film. The description of these steps is the same as the above description in the method of manufacturing the electrode structure.

In addition, the present invention provides a redox flow battery stack configuration, in which a plurality of battery cells, each comprising a bipolar plate, a positive electrode plate, a negative electrode plate and a separator, is stacked inside a pair of end plates, and an anode electrolyte solution and a cathode electrolyte solution are individually supplied to the stacked battery cells. Here, each of the pair of end plates includes an electrolyte solution outlet, and a middle plate having an electrolyte solution inlet may be disposed at the middle portion of the stacked battery cells.

In addition, the present invention provides a redox flow battery stack configuration, in which a plurality of battery cells, each comprising a positive electrode plate, a negative electrode plate and a separator, is stacked inside a pair of end plates, and an anode electrolyte solution and a cathode electrolyte solution are individually supplied to the stacked battery cells. Here, at least one of electrodes that constitute the positive electrode plate and the negative electrode plate is a porous electrode comprising a porous conductor and a binder and having a pattern layer or a mesh layer formed on at least one surface thereof, and each of the pair of end plates includes an electrolyte solution outlet, and a middle plate having an electrolyte solution inlet may be disposed at the middle portion of the stacked battery cells.

The end plate may include an outlet for an anode electrolyte solution and a cathode electrolyte solution, and the middle plate may include an inlet for an anode electrolyte solution and a cathode electrolyte solution.

The redox flow battery stack configuration may be formed such that the electrolyte solution fed through the electrolyte solution inlet in the middle plate is transferred toward left and right sides thereof.

In addition, the present invention provides a redox flow battery stack configuration, in which a plurality of battery cells, each comprising a bipolar plate, a first electrode plate, a second electrode plate and a separator, is stacked inside a pair of end plates, and an anode electrolyte solution and a cathode electrolyte solution are individually supplied to the stacked battery cells. Here, the first electrode plate is configured such that a single electrode plate includes a first positive electrode and a first negative electrode, and the second electrode plate is configured such that a single electrode plate includes a second positive electrode and a second negative electrode and is disposed so as to face the first electrode plate on the basis of the separator. The separator having through-holes therein may be disposed between the first electrode plate including the first positive electrode and the first negative electrode and the second electrode plate including the second positive electrode and the second negative electrode. Furthermore, the electrolyte solution, which is introduced into the first positive electrode of the battery cell and allowed to react, is fed into the second positive electrode through the through-holes in the separator, allowed to react and then discharged, or is fed into the first positive electrode of the adjacent battery cell and allowed to react, and the electrolyte solution, which is introduced into the first negative electrode of the battery cell and allowed to react, is fed into the second negative electrode through the through-holes in the separator, allowed to react and then discharged, or is fed into the first negative electrode of the adjacent battery cell and allowed to react.

In addition, the present invention provides a redox flow battery stack configuration, in which a plurality of battery cells, each comprising a first electrode plate, a second electrode plate and a separator, is stacked inside a pair of end plates, and an anode electrolyte solution and a cathode electrolyte solution are individually supplied to the stacked battery cells. Here, the first electrode plate is configured such that a single electrode plate includes a first positive electrode and a first negative electrode, and the second electrode plate is configured such that a single electrode plate includes a second positive electrode and a second negative electrode and is disposed so as to face the first electrode plate on the basis of the separator. The separator having through-holes therein may be disposed between the first electrode plate including the first positive electrode and the first negative electrode and the second electrode plate including the second positive electrode and the second negative electrode. At least one of the positive electrode and the negative electrode is a porous electrode comprising a porous conductor and a binder and having a pattern layer or a mesh layer formed on at least one surface thereof. The electrolyte solution, which is introduced into the first positive electrode of the battery cell and allowed to react, is fed into the second positive electrode through the through-holes in the separator, allowed to react and then discharged, or is fed into the first positive electrode of the adjacent battery cell and allowed to react, and the electrolyte solution, which is introduced into the first negative electrode of the battery cell and allowed to react, is fed into the second negative electrode through the through-holes in the separator, allowed to react and then discharged, or is fed into the first negative electrode of the adjacent battery cell and allowed to react.

This stack configuration may be formed such that the electrolyte solution is made to flow through one or more electrodes connected in series.

In addition, the present invention provides a redox flow battery stack configuration, in which a plurality of battery cells, each comprising a bipolar plate, a first electrode plate, a second electrode plate and a separator, is stacked inside a pair of end plates, and an anode electrolyte solution and a cathode electrolyte solution are individually supplied to the stacked battery cells. Here, the first electrode plate is configured such that a single electrode plate includes a first positive electrode and a first negative electrode, and the second electrode plate is configured such that a single electrode plate includes a second positive electrode and a second negative electrode and is disposed so as to face the first electrode plate on the basis of the separator. The electrolyte solution, which is introduced into the first positive electrode and allowed to react, is fed into the second positive electrode, and the electrolyte solution, which is introduced into the first negative electrode and allowed to react, is fed into the second negative electrode.

In addition, the present invention provides a redox flow battery stack configuration, in which a plurality of battery cells, each comprising a first electrode plate, a second electrode plate and a separator, is stacked inside a pair of end plates, and an anode electrolyte solution and a cathode electrolyte solution are individually supplied to the stacked battery cells. Here, the first electrode plate is configured such that a single electrode plate includes a first positive electrode and a first negative electrode, and the second electrode plate is configured such that a single electrode plate includes a second positive electrode and a second negative electrode and is disposed so as to face the first electrode plate on the basis of the separator. At least one of the positive electrode and the negative electrode is a porous electrode comprising a porous conductor and a binder and having a pattern layer or a mesh layer formed on at least one surface thereof. The electrolyte solution, which is introduced into the first positive electrode and allowed to react, is fed into the second positive electrode, and the electrolyte solution, which is introduced into the first negative electrode and allowed to react, is fed into the second negative electrode.

The separator having through-holes therein may be disposed between the first electrode plate including the first positive electrode and the first negative electrode and the second electrode plate including the second positive electrode and the second negative electrode, and the electrolyte solution, which is introduced into the first positive electrode and allowed to react, may be fed into the second positive electrode through the through-holes in the separator, and the electrolyte solution, which is introduced into the first negative electrode and allowed to react, may be fed into the second negative electrode through the through-holes in the separator.

In addition, the present invention provides a redox flow battery stack configuration, in which a plurality of battery cells, each comprising a bipolar plate, a first electrode plate, a second electrode plate and a separator, is stacked inside a pair of end plates, and an anode electrolyte solution and a cathode electrolyte solution are individually supplied to the stacked battery cells. Each of the battery cells is configured such that the first electrode plate, the separator and the second electrode plate are sequentially disposed. Here, the first electrode plate is configured such that a single electrode plate includes a positive electrode and a negative electrode, and the second electrode plate is configured such that a single electrode plate includes a positive electrode and a negative electrode and is disposed so as to face the first electrode plate on the basis of the separator. The electrolyte solution, which is introduced into the positive electrode of the battery cell and allowed to react, is fed into the positive electrode of the adjacent battery cell, allowed to react and then discharged, or is fed into the positive electrode of another battery cell, and the electrolyte solution, which is introduced into the negative electrode of the battery cell and allowed to react, is fed into the negative electrode of the adjacent battery cell, allowed to react and then discharged, or is fed into the negative electrode of another battery cell.

In addition, the present invention provides a redox flow battery stack configuration, in which a plurality of battery cells, each comprising a first electrode plate, a second electrode plate and a separator, is stacked inside a pair of end plates, and an anode electrolyte solution and a cathode electrolyte solution are individually supplied to the stacked battery cells. Each of the battery cells is configured such that the first electrode plate, the separator and the second electrode plate are sequentially disposed. Here, the first electrode plate is configured such that a single electrode plate includes a positive electrode and a negative electrode, and the second electrode plate is configured such that a single electrode plate includes a positive electrode and a negative electrode and is disposed so as to face the first electrode plate on the basis of the separator. At least one of the positive electrode and the negative electrode is a porous electrode comprising a porous conductor and a binder and having a pattern layer or a mesh layer formed on at least one surface thereof. The electrolyte solution, which is introduced into the positive electrode of the battery cell and allowed to react, is fed into the positive electrode of the adjacent battery cell, allowed to react and then discharged, or is fed into the positive electrode of another battery cell, and the electrolyte solution, which is introduced into the negative electrode of the battery cell and allowed to react, is fed into the negative electrode of the adjacent battery cell, allowed to react and then discharged, or is fed into the negative electrode of another battery cell.

This stack configuration may be formed such that the electrolyte solution is made to flow through one or more electrodes connected in series.

Specifically, in the configuration in which a first battery cell, a second battery cell, . . . , an $n-1^{th}$ battery cell and an $n^{th}$ battery cell are stacked, the electrolyte solution that reacts in the first battery cell is transferred to the second battery cell at the rear thereof along the flow path, and the electrolyte solution is made to flow through electrodes connected in series. Also in this stack configuration, the electrolyte solution that reacts in the second battery cell may be transferred to the electrodes (reaction portions) of one or more other battery cells connected in series.

In addition, the present invention provides a redox flow battery stack configuration, in which a plurality of battery cells, each comprising a bipolar plate, a first electrode plate, a second electrode plate and a separator, is stacked inside a pair of end plates, and an anode electrolyte solution and a cathode electrolyte solution are individually supplied to the stacked battery cells. The stacked battery cells comprise a first battery cell, a second battery cell, . . . , an $n-1^{th}$ battery cell and an $n^{th}$ battery cell, and each of the battery cells is configured such that the first electrode plate, the separator and the second electrode plate are sequentially disposed. The first electrode plate is configured such that a single electrode plate includes a first positive electrode and a first negative electrode, and the second electrode plate is configured such that a single electrode plate includes a second positive electrode and a second negative electrode and is disposed so as to face the first electrode plate on the basis of the separator. In the first battery cell, the electrolyte solution introduced into the first positive electrode and the electrolyte solution introduced into the first negative electrode are individually allowed to react and then discharged, and the electrolyte solution, which is introduced into the first negative electrode of the second battery cell and allowed to react, is fed into the second negative electrode of the first battery cell, allowed to react and then discharged, and the electrolyte solution, which is introduced into the first positive electrode of the second battery cell and allowed to react, is fed into the second positive electrode of the first battery cell, allowed to react and then discharged. Furthermore, the electrolyte solution, which is introduced into the first positive electrode of the $n^{th}$ battery cell and allowed to react, is fed into the second positive electrode of the $n-1^{th}$ battery cell, allowed to react and then discharged, and the electrolyte solution, which is introduced into the first negative electrode of the $n^{th}$ battery cell and allowed to react, is fed into the second negative electrode of the n−1$^{th}$ battery cell, allowed to react and then discharged, and the electrolyte solution introduced into the second positive electrode of the n$^{th}$ battery cell and the electrolyte solution introduced into the second negative electrode thereof are individually allowed to react and then discharged.

In addition, the present invention provides a redox flow battery stack configuration, in which a plurality of battery cells, each comprising a first electrode plate, a second electrode plate and a separator, is stacked inside a pair of end plates, and an anode electrolyte solution and a cathode electrolyte solution are individually supplied to the stacked battery cells. The stacked battery cells comprise a first battery cell, a second battery cell, . . . , an n−1$^{th}$ battery cell and an n$^{th}$ battery cell, and each of the battery cells is configured such that the first electrode plate, the separator and the second electrode plate are sequentially disposed. The first electrode plate is configured such that a single electrode plate includes a first positive electrode and a first negative electrode, and the second electrode plate is configured such that a single electrode plate includes a second positive electrode and a second negative electrode and is disposed so as to face the first electrode plate on the basis of the separator. At least one of the positive electrode and the negative electrode may be a porous electrode comprising a porous conductor and a binder, and the porous electrode may include a pattern layer or a mesh layer formed on at least one surface thereof. In the first battery cell, the electrolyte solution introduced into the first positive electrode and the electrolyte solution introduced into the first negative electrode are individually allowed to react and then discharged, and the electrolyte solution, which is introduced into the first negative electrode of the second battery cell and allowed to react, is fed into the second negative electrode of the first battery cell, allowed to react and then discharged, and the electrolyte solution, which is introduced into the first positive electrode of the second battery cell and allowed to react, is fed into the second positive electrode of the first battery cell, allowed to react and then discharged. Furthermore, the electrolyte solution, which is introduced into the first positive electrode of the n$^{th}$ battery cell and allowed to react, is fed into the second positive electrode of the n−1$^{th}$ battery cell, allowed to react and then discharged, and the electrolyte solution, which is introduced into the first negative electrode of the n$^{th}$ battery cell and allowed to react, is fed into the second negative electrode of the n−1$^{th}$ battery cell, allowed to react and then discharged, and the electrolyte solution introduced into the second positive electrode of the n$^{th}$ battery cell and the electrolyte solution introduced into the second negative electrode thereof are individually allowed to react and then discharged.

In addition, the present invention provides a redox flow battery stack configuration, in which a plurality of battery cells, each comprising a bipolar plate, a positive electrode, a negative electrode and a separator, is stacked inside a pair of end plates, and an anode electrolyte solution and a cathode electrolyte solution are individually supplied to the stacked battery cells. The separator has through-holes through which the electrolyte solution passes. The electrolyte solution, which is introduced into the positive electrode of the battery cell and allowed to react, is fed into the positive electrode of the adjacent battery cell through the through-holes in the separator, allowed to react and then discharged, or is fed into the positive electrode of the adjacent next battery cell through the through-holes in the separator and allowed to react, and the electrolyte solution, which is introduced into the negative electrode of the battery cell and allowed to react, is fed into the negative electrode of the adjacent battery cell through the through-holes in the separator, allowed to react and then discharged, or is fed into the negative electrode of the adjacent next battery cell through the through-holes in the separator and allowed to react.

In addition, the present invention provides a redox flow battery stack configuration, in which a plurality of battery cells, each comprising a positive electrode, a negative electrode and a separator, is stacked inside a pair of end plates, and an anode electrolyte solution and a cathode electrolyte solution are individually supplied to the stacked battery cells. At least one of the positive electrode and the negative electrode may be a porous electrode comprising a porous conductor and a binder, and the porous electrode may include a pattern layer or a mesh layer formed on at least one surface thereof, and the separator has through-holes through which the electrolyte solution passes. The electrolyte solution, which is introduced into the positive electrode of the battery cell and allowed to react, is fed into the positive electrode of the adjacent battery cell through the through-holes in the separator, allowed to react and then discharged, or is fed into the positive electrode of the adjacent next battery cell through the through-holes in the separator and allowed to react, and the electrolyte solution, which is introduced into the negative electrode of the battery cell and allowed to react, is fed into the negative electrode of the adjacent battery cell through the through-holes in the separator, allowed to react and then discharged, or is fed into the negative electrode of the adjacent next battery cell through the through-holes in the separator and allowed to react.

In this stack configuration, the electrolyte solution is made to flow through one or more electrodes connected in series across one or more opposite electrodes.

In addition, the present invention provides a redox flow battery stack configuration, in which a plurality of battery cells, each comprising a bipolar plate, a positive electrode, a negative electrode and a separator, is stacked inside a pair of end plates, and an anode electrolyte solution and a cathode electrolyte solution are individually supplied to the stacked battery cells. The stacked battery cells comprise a first battery cell, a second battery cell, . . . , an n−1$^{th}$ battery cell and an n$^{th}$ battery cell, and the separator has through-holes through which the electrolyte solution passes. The electrolyte solution, which is introduced into the positive electrode of the first battery cell and allowed to react, is fed into the positive electrode of the second battery cell through the through-holes in the separator, allowed to react and then discharged, and the electrolyte solution, which is introduced into the negative electrode of the first battery cell and allowed to react, is fed into the negative electrode of the second battery cell through the through-holes in the separator, allowed to react and then discharged. The electrolyte solution, which is introduced into the positive electrode of the n−1$^{th}$ battery cell and allowed to react, is fed into the positive electrode of the n$^{th}$ battery cell through the through-holes in the separator, allowed to react and then discharged, and the electrolyte solution, which is introduced into the negative electrode of the n−1$^{th}$ battery cell and allowed to react, is fed into the negative electrode of the n$^{th}$ battery cell through the through-holes in the separator, allowed to react and then discharged.

In addition, the present invention provides a redox flow battery stack configuration, in which a plurality of battery cells, each comprising a positive electrode, a negative electrode and a separator, is stacked inside a pair of end plates, and an anode electrolyte solution and a cathode electrolyte solution are individually supplied to the stacked battery cells. The stacked battery cells comprise a first battery cell, a second battery cell, ..., an n-1$^{th}$ battery cell and an n$^{th}$ battery cell, and at least one of the positive electrode and the negative electrode may be a porous electrode comprising a porous conductor and a binder and having a pattern layer or a mesh layer formed on at least one surface thereof, and the separator has through-holes through which the electrolyte solution passes. The electrolyte solution, which is introduced into the positive electrode of the first battery cell and allowed to react, is fed into the positive electrode of the second battery cell through the through-holes in the separator, allowed to react and then discharged, and the electrolyte solution, which is introduced into the negative electrode of the first battery cell and allowed to react, is fed into the negative electrode of the second battery cell through the through-holes in the separator, allowed to react and then discharged. The electrolyte solution, which is introduced into the positive electrode of the n-1$^{th}$ battery cell and allowed to react, is fed into the positive electrode of the n$^{th}$ battery cell through the through-holes in the separator, allowed to react and then discharged, and the electrolyte solution, which is introduced into the negative electrode of the n-1$^{th}$ battery cell and allowed to react, is fed into the negative electrode of the n$^{th}$ battery cell through the through-holes in the separator, allowed to react and then discharged. The detailed description of the porous electrode is the same as above and is thus omitted.

According to the present invention, an electrode structure includes, as an integrated porous electrode simultaneously responsible for the functions both of a bipolar plate and of a felt electrode, a porous electrode having a pattern layer having a flow path function on the surface thereof. Since the bipolar plate and the felt electrode are integrally provided, contact resistance is decreased, thus drastically improving the efficiency of an electrochemical device such as a redox flow battery and lowering the manufacturing costs. When a redox flow battery comprising a plurality of stacked unit cells is manufactured, the volume of the stack is remarkably decreased to thus increase stacking efficiency and power density. Furthermore, the formation thereof in a large area and in a large capacity is easy, thus generating economic benefits, and the stacking process is simplified to thus facilitate the working process and the application thereof to an automated system. When a redox flow battery is manufactured using a 150 W-grade electrode structure including the integrated porous electrode according to the present invention, the power density can be more than doubled, from 67 W/L to 167 W/L.

In a redox flow battery stack configuration according to an embodiment of the present invention, an electrolyte solution inlet is formed in the middle portion of the stack so that the electrolyte solution is transferred toward the left and right sides of the stack, whereby the transfer distance of the electrolyte solution can be set to be about ½ shorter than the conventional distance. Accordingly, the problem of pressure dropping of the middle portion can be solved, and voltage and current distribution between cells can be improved, thus achieving pressure dropping and shunt current reduction effects. Ultimately, cell performance and durability can be improved.

In addition, a redox flow battery stack configuration according to another embodiment of the present invention is formed such that an electrolyte solution that reacts at one reaction electrode can be transferred to another reaction electrode (a manifold reaction electrode) at the rear thereof, thus decreasing the number of nodes of the electrolyte solution between the cells and lowering the shunt current that occurs through the flow path due to an increase in the resistance of the electrolyte solution with an increase in the length of the flow path.

In a typical redox flow battery configuration, the electrolyte solution between the cells flows along flow paths connected in parallel, thus increasing the number of nodes of the electrolyte solution between the cells. When the flow path formed in the cell is filled with the electrolyte solution as a conductive material, it can function as an electrically conductive line. As the number of nodes is increased, the electrolyte solution that reacts in the reaction portion acts as shunt current along the flow paths connected in parallel to thus lower the efficiency thereof. In the stack configuration according to the present invention, the flow paths of the electrolyte solution are designed so as to be connected in series such that the electrolyte solution that reacts at one reaction electrode is transferred to another reaction electrode at the rear thereof, thereby decreasing the number of nodes of the electrolyte solution to thus lower the shunt current. Furthermore, the reacted electrolyte solution is transferred to the rear reaction portion to thus increase the length of the flow path, and the length of the flow path filled with the electrolyte solution is increased, whereby the resistance of the flow path is increased to thus decrease shunt current.

REFERENCE NUMERALS

Figure 1A:
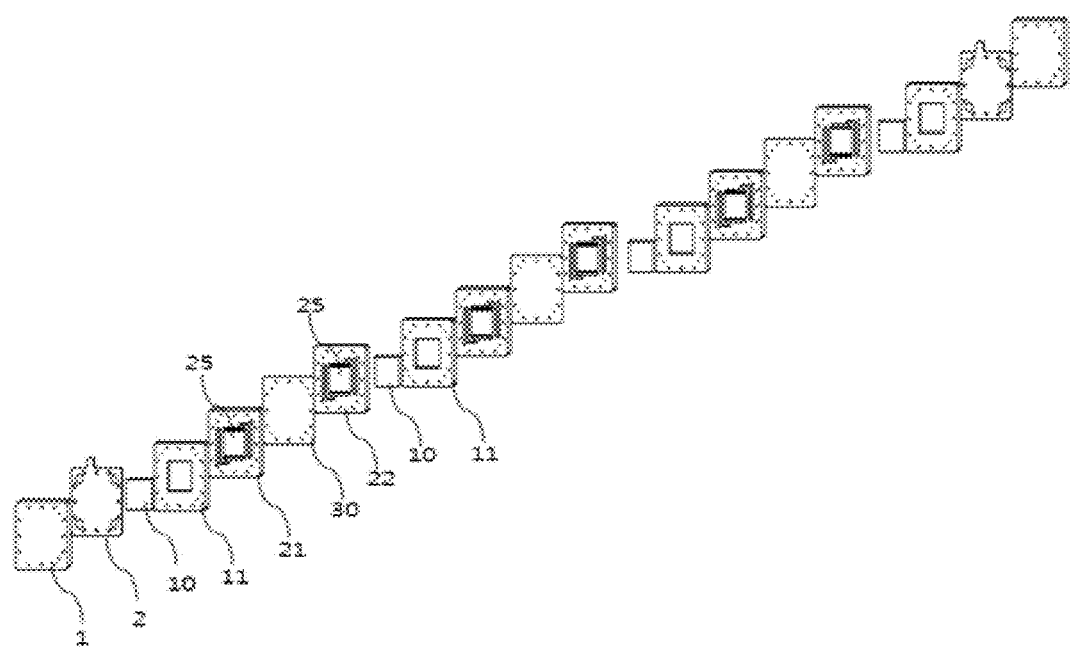
FIG. 1A schematically shows a conventional redox flow battery stack configuration.
Figure 1B:
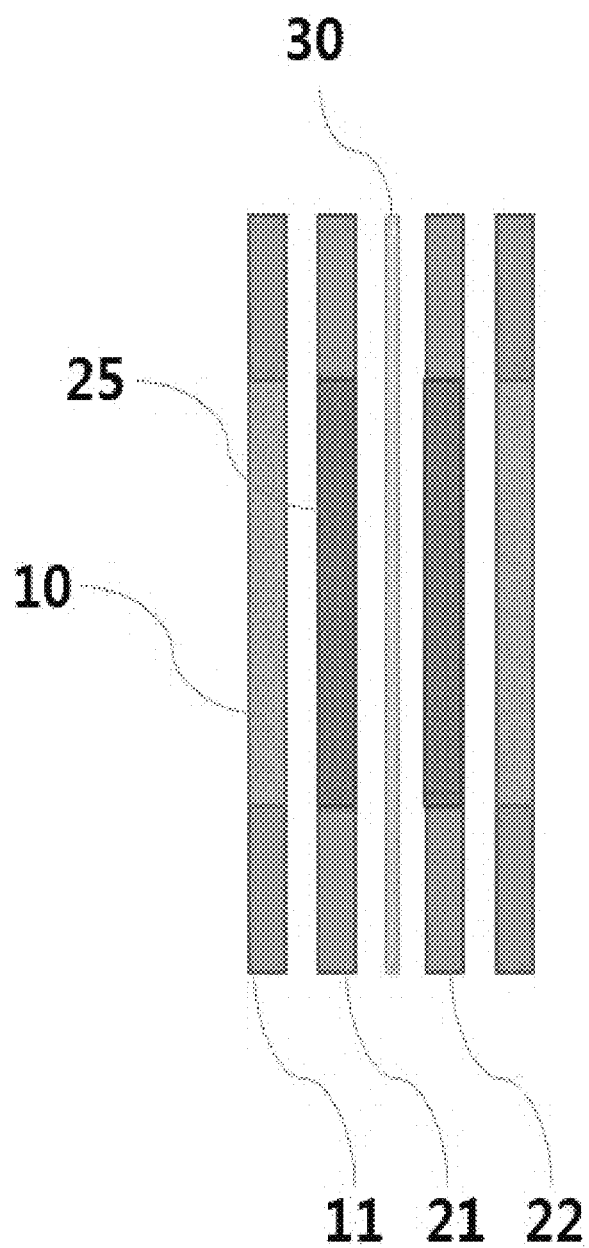
FIG. 1B schematically shows a conventional electrode structure.

1, 1$a$, 1$b$, 211$a$, 211$b$, 301: end plate
211$c$: middle plate
2, 2$a$, 2$b$, 212$a$, 212$b$: current collector
10, 210, 302: bipolar plate, 11: bipolar plate frame
21, 121: first manifold, 22, 122: second manifold 25, 225, 226: electrode,
110: integrated porous electrode
310: positive electrode, 320: negative electrode
311: first positive electrode
312: first negative electrode
313: second positive electrode
314: second negative electrode
30, 130, 230, 330: separator

DESCRIPTION OF SPECIFIC EMBODIMENTS

Hereinafter, a detailed description will be given of embodiments of the present invention with reference to the accompanying drawings. The purposes, features, and advantages of the present invention will be easily understood through the following embodiments. The present invention is not limited to these embodiments, but may be embodied in other forms. These embodiments are provided such that the spirit of the present invention may be sufficiently transferred to those skilled in the art to which the present invention belongs. Therefore, the following embodiments are not to be construed as limiting the present invention. As used herein, when any part "includes" any element, it means that the other elements are not precluded but are further included, unless otherwise mentioned.

As used herein, when any member is positioned "on" another member, it should be understood that a member may be directly provided on another member, or alternatively that a further member may be interposed between the two members.

As used herein, the term "conductivity" refers to "electrical conductivity".

As used herein, the term "porous" refers to the case including micropores or mesopores having a size of 2 nm or more.

More specifically, a porous material is a material in which about 15 to 95% of the volume thereof comprises pores. A representative porous material is exemplified by activated carbon. Porous carbon has multiple micropores and mesopores in the solid structure thereof.

For reference, a detailed description of the same construction as the conventional technology mentioned in the Description of the Related Art, among the constructions of the present invention to be described below, will be omitted.

Figure 2A:
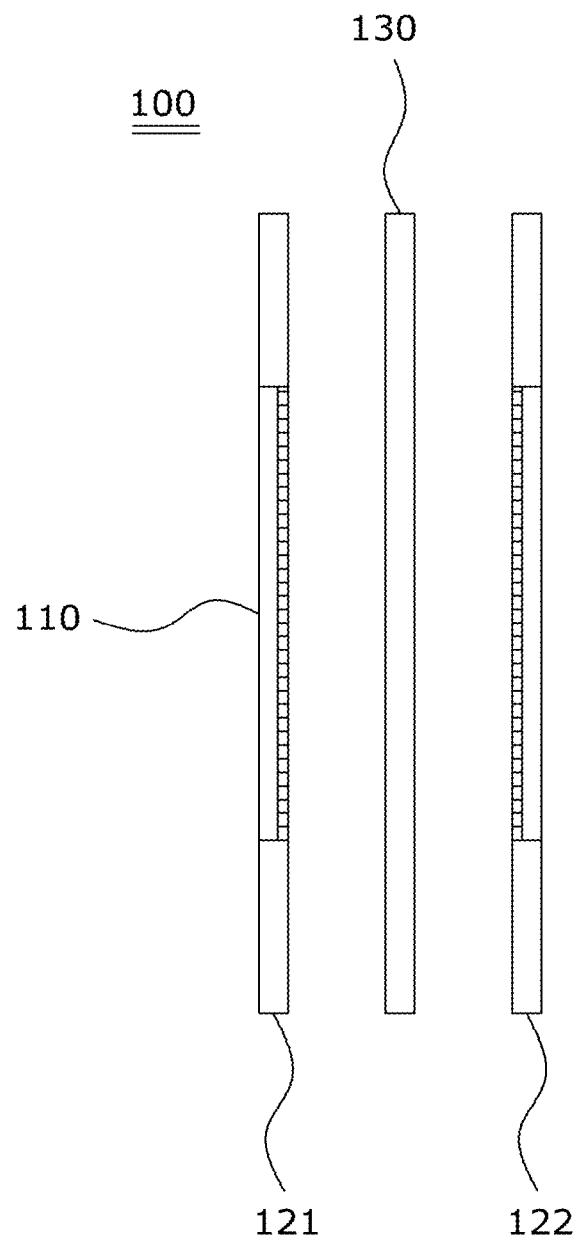
FIG. 2A schematically shows an electrode structure according to an embodiment of the present invention.

FIG. 2A shows an electrode structure 100 including a porous electrode 110 according to an embodiment of the present invention.

Figure 2B:
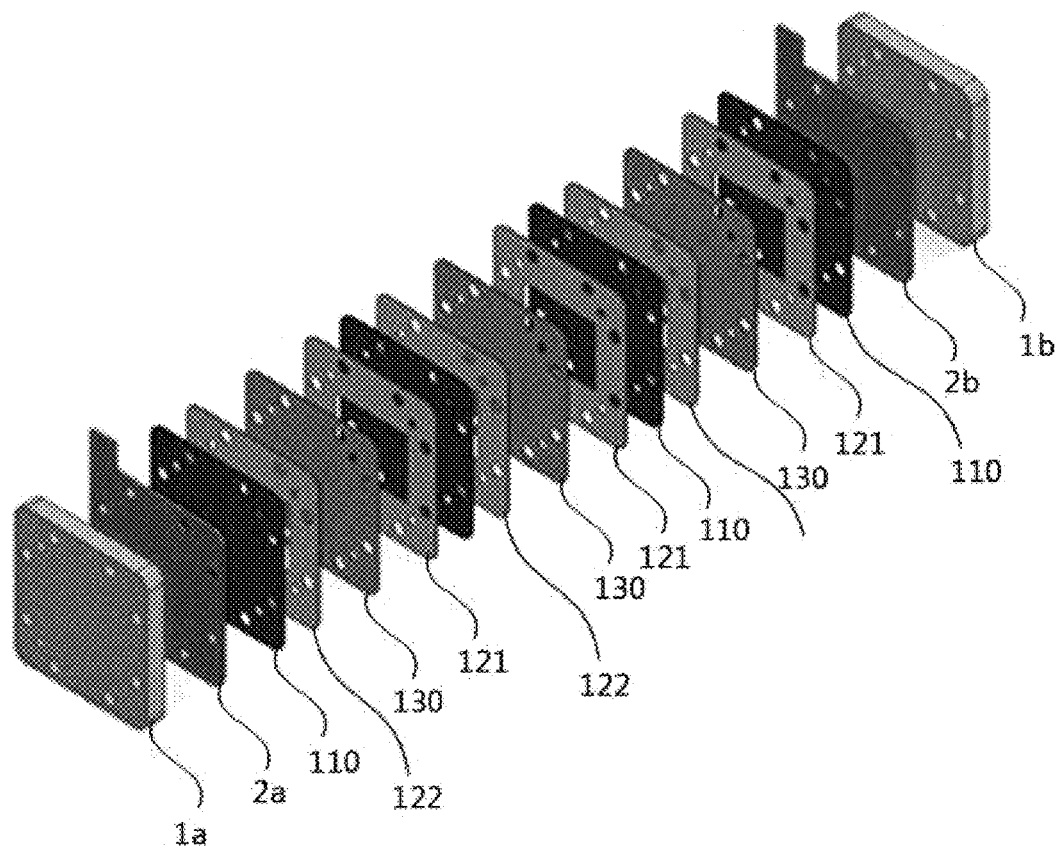
FIG. 2B schematically shows a redox flow battery stack configuration according to an embodiment of the present invention.

FIG. 2B schematically shows a redox flow battery stack configuration including the electrode structure 100 according to an embodiment of the present invention.

According to an embodiment of the present invention, the electrode structure 100 may be configured to include a positive electrode, a negative electrode disposed so as to face the positive electrode, and a separator 130 disposed between the positive electrode and the negative electrode. At least one of the positive electrode and the negative electrode may be a porous electrode 110 comprising a porous conductor and a binder, and the porous electrode 110 may have a pattern layer or a mesh layer formed on at least one surface thereof. The porous electrode 110 may be provided in the form of an integrated electrode that simultaneously performs the functions both of a bipolar plate and of a felt electrode. The pattern layer or the mesh layer may facilitate the flow of fluid while increasing the specific surface area of the integrated porous electrode 110.

The electrode structure may be provided in an integrated form in which the porous electrode and the separator are bonded to each other.

The porous conductor may include a first conductive material having a porous structure and a second conductive material including at least one selected from the group consisting of a carbon-based material, a metal, and a metal coated with a carbon-based material.

The first conductive material may be a porous material (a carbon-based material, etc.) for providing a large specific surface area, and the second conductive material may be a carbon-based material for increasing conductivity. The first conductive material and the second conductive material are preferably composed of different materials, but the same material therefor may be applied.

The first conductive material may include a material having a porous structure with a large specific surface area. Specifically, the first conductive material has a specific surface area of 1 $m^2/g$ or more, and preferably 500 $m^2/g$ to 3,000 $m^2/g$.

The first conductive material may include a carbon-based material. The carbon-based material may include any one or a mixture of two or more selected from the group consisting of activated carbon, graphite, carbon black, acetylene black, Denka black, Ketjen black, mesoporous carbon, graphene, a carbon nanotube, a carbon nanofiber, a carbon nanohorn, a carbon nanoring, a carbon nanowire, fullerene and super P. Preferably useful is activated carbon.

When a carbon-based material having a specific surface area of 500 $m^2/g$ or more is used as the first conductive material, sufficient area for a redox reaction (oxidation and reduction) may be ensured, and the functions both of a felt electrode and of a bipolar plate may be simultaneously performed using the conductivity of the carbon material alone.

The second conductive material may include at least one selected from the group consisting of a carbon-based material, a metal, and a metal coated with a carbon-based material.

The metal may include, but is not limited to, a single metal or a metal alloy of two or more selected from the group consisting of Cu, Al, Ti, Au, Pt, Fe, Ag, Si, Sn, Bi, Mg, Zn, In, Ge and Pb. Here, any metal material may be used so long as it is conductive.

The description of the carbon-based material is the same as above.

The binder may include, but is not limited to, at least one selected from the group consisting of polytetrafluoroethylene (PTFE), polyvinylidene fluoride (PVDF), carboxymethylcellulose (CMC), polyvinyl alcohol (PVA), polyvinyl butyral (PVB), polyvinyl pyrrolidone (PVP), polyethylene (PE), molasses, and styrene butadiene rubber (SBR), and any material may be used so long as it may function as a binder able to bind a material for the porous electrode.

Specifically, the binder may increase adhesion of material particles of the porous electrode 110 to raise a filling density or improve electrode flexibility so as to prevent brittleness from increasing.

In the case where it is difficult to mix the binder with the material of the porous electrode 110 due to excessively high viscosity of the binder, a dispersion medium may be added to the binder so that the viscosity of the binder is appropriately adjusted. The term "dispersion medium" may also refer to a solvent, and specific examples thereof may include, but are not limited to, organic solvents such as ethanol, acetone, isopropylalcohol, methyl pyrrolidone, propylene glycol, etc., and water, which may be used alone or in combinations thereof.

The porous electrode 110 may include, based on the total weight of the porous electrode, 40 to 90 wt % of the first conductive material, 0.3 to 30 wt % of the second conductive material, and 1 to 30 wt % of the binder.

If the amount of the first conductive material is less than 40 wt %, a redox reaction (oxidation and reduction) does not occur sufficiently, thus deteriorating battery performance. On the other hand, if the amount of the first conductive material exceeds 90 wt %, the relative amounts of second conductive material and binder are decreased, and thus the bondability of the materials that constitute the porous electrode 110 may decrease, undesirably deteriorating the durability of the porous electrode 110. Also, if the amount of the second conductive material is less than 0.3 wt %, charge transfer between the current collectors 2a, 2b and the porous electrode 110 does not progress sufficiently, making it impossible to carry out an electrochemical reaction. On the other hand, if the amount of the second conductive material exceeds 30 wt %, it is not easy to mix the first conductive material and the binder.

If the amount of the binder is less than 1 wt %, bondability between particles of the first conductive material and the second conductive material cannot be realized. On the other hand, if the amount of the binder exceeds 30 wt %, the relative amounts of the first conductive material and the second conductive material are decreased, undesirably deteriorating the performance of the porous electrode 110.

The pattern layer of the porous electrode 110 includes a patterned portion and a non-patterned portion, and the patterned portion includes a pattern having at least one recess or at least one protrusion, and the non-patterned portion may be disposed so as to be close to the outside of the porous electrode, and the patterned portion may be disposed so as to be close to the inside of the porous electrode.

The recess and the protrusion are conceptually defined relative to each other.

In the pattern, the case where the thickness of the pattern that is closest to the non-patterned portion is less than the thickness of the porous electrode 110 may be called a recess, and a portion between two recesses adjacent to each other may be called a protrusion. Also, in the pattern, the case where the thickness of the pattern that is closest to the non-patterned portion is greater than the thickness of the porous electrode 110 may be a protrusion, and a portion between two protrusions adjacent to each other may be a recess.

The term "adjacent" refers to the state in which no additional recess/protrusion is provided between two recesses/protrusions. For example, the term "adjacent" may also be used as the term "closest".

When an arbitrary line is drawn in a direction parallel to the surface of the porous electrode 110 from the highest position of the non-patterned portion, the case where the highest position of the pattern that is closest to the non-patterned portion is lower than the arbitrary line may be called a recess, and the case where the highest position of the pattern that is closest to the non-patterned portion is higher than the arbitrary line may be called a protrusion.

Figure 3:
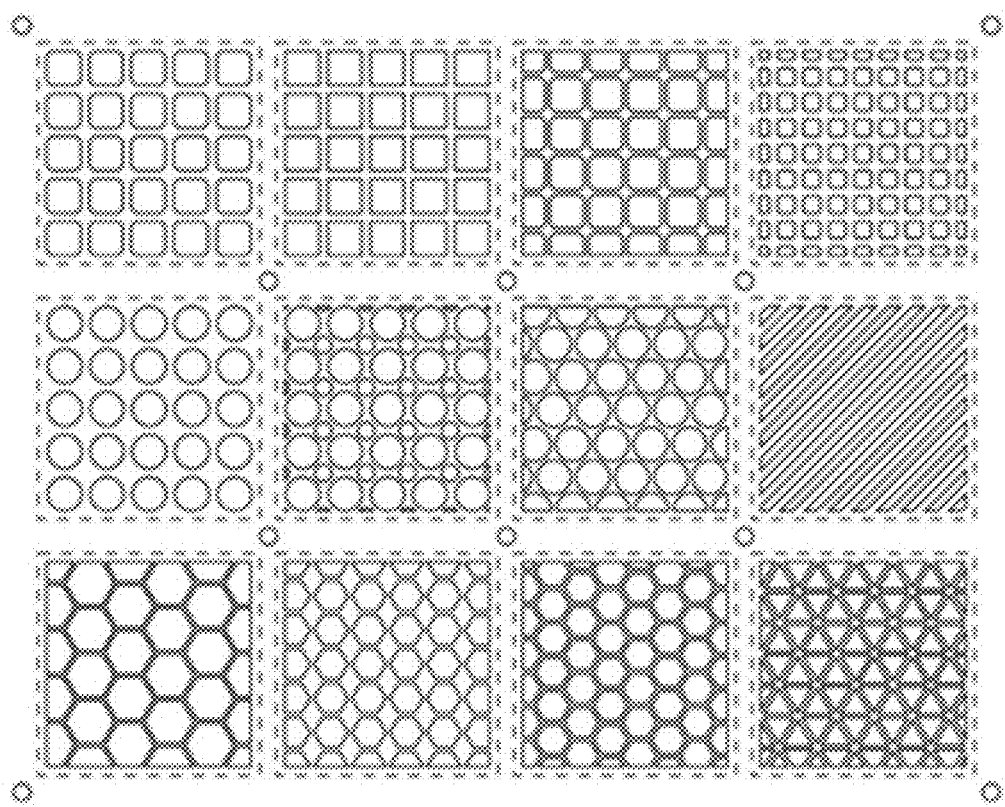
FIG. 3 schematically shows pattern shapes that may be formed on the surface of a porous electrode according to an embodiment of the present invention.
Figure 4:
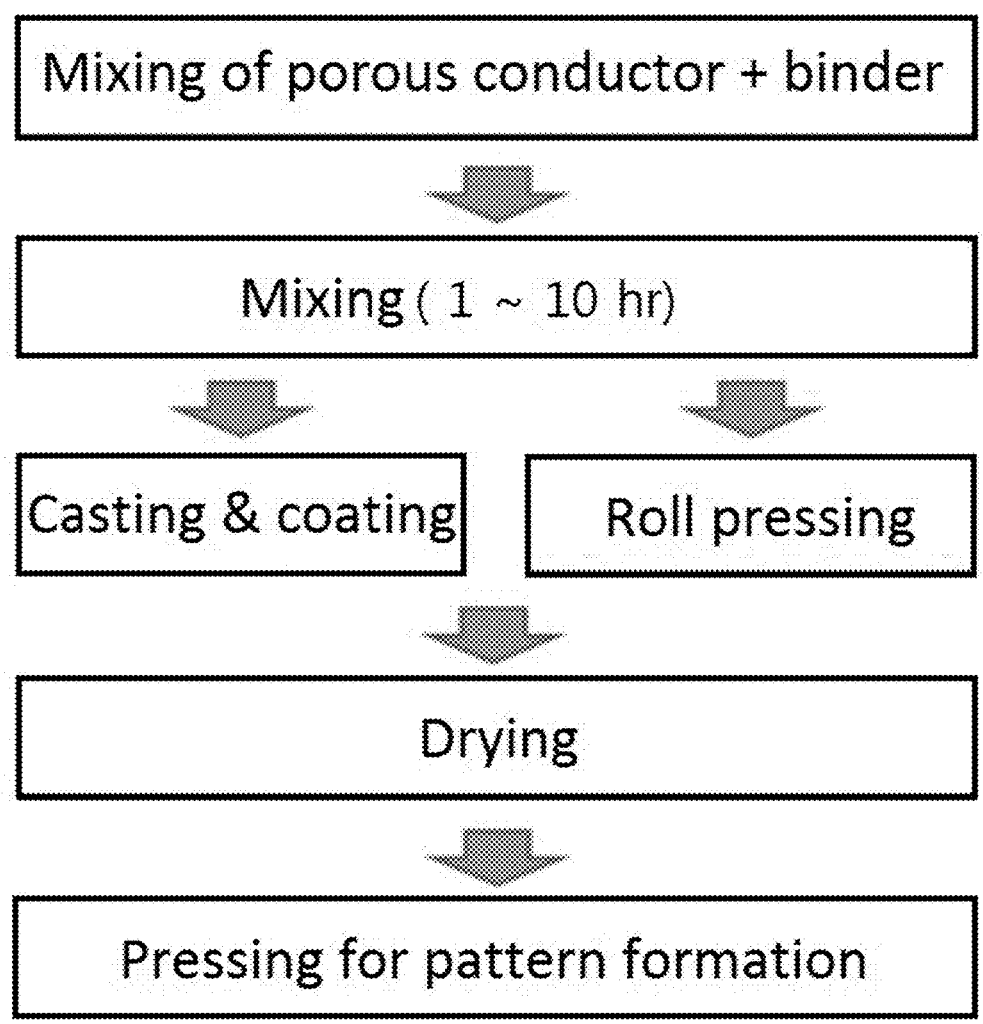
FIG. 4 is a flowchart schematically showing a process of manufacturing a porous electrode according to an embodiment of the present invention.

The shape of the horizontal cross-section of the recess or protrusion may be selected from the group consisting of a circular shape and a polygonal shape (FIG. 3). The term "horizontal cross-section" refers to a cross-section when the recess or protrusion of the pattern is cut in a direction parallel to the surface of the porous electrode 110.

The thickness of the pattern that is closest to the non-patterned portion may be 0.5 times to less than 1 times the thickness of the non-patterned portion, or may be 2 times or less but exceeding 1 times the thickness of the non-patterned portion.

When the thickness of the pattern falls within the above range, the porous electrode 110 may exhibit superior durability.

The pattern may also function as a flow path to thus facilitate the flow of an electrolyte solution, thereby increasing battery performance.

The patterned portion may refer to the range of a rectangle in which arbitrary lines are drawn from the center point of the porous electrode 110 to the outermost four vertices of the porous electrode 110 and the vertices of the rectangle including all patterns formed in the patterned portion are incorporated in the arbitrary lines.

The patterned portion is a portion where oxidation and reduction of the electrolyte solution of the redox flow battery occur. When the porous electrode 110 (an integrated electrode) is positioned at both sides of the separator, it indicates a portion where oxidation and reduction occur on the basis of the separator.

The non-patterned portion may refer to a portion of the surface of the porous electrode 110 other than the patterned portion. Briefly, the non-patterned portion may be in a frame form.

It is preferred that the center of the patterned portion be positioned at the center of the porous electrode 110. The center of the patterned portion may refer to the center of a rectangle including the patterned portion.

According to an embodiment of the present invention, the porous electrode 110 includes a pattern layer, whereby a specific surface area is enlarged and electrochemical performance is maximized.

The width variation of the non-patterned portion may be zero. The width of the non-patterned portion may indicate the shortest distance to the patterned portion from any point on the corner of the porous electrode 110 that is the outermost position of the non-patterned portion. The non-patterned portion may have a uniform width.

The thickness of the porous electrode 110 may range from 0.01 mm to 2 mm. When the thickness of the porous electrode 110 falls within the above range, the volume of the stack may be decreased, and thus the stack power density may be prevented from decreasing.

The thickness of the porous electrode 110 may indicate a thickness other than the pattern layer. The pattern layer may be used as a flow path of the electrolyte solution.

The thickness of the electrode structure 100 is 10 mm or less, and preferably 0.025 mm to 5 mm. Specifically, when both the positive electrode and the negative electrode of the above structure are a porous electrode 110, the thickness of the positive electrode and the negative electrode may range from 0.01 mm to 2 mm, and the thickness of the separator 130 may range from 0.005 mm to 0.5 mm.

When the thickness of the electrode structure 100 falls within the above range, it is possible to provide a redox flow battery configuration in which the capacity of the redox flow battery is increased per volume by decreasing the volume of the stack. Furthermore, the working time may be shortened by virtue of an easy stacking process.

The distance between the porous electrode 110 and the separator 130 is 0 to 3 mm, preferably 0 to 1 mm, and preferably 0.1 to 0.5 mm. When the distance between the porous electrode 110 and the separator 130 falls within the above range, the resistance of the electrolyte solution is decreased and thus battery resistance may be lowered, thus realizing high power output. The case where the distance between the porous electrode 110 and the separator 130 is zero means that the porous electrode 110 is completely in contact with the separator 130. When the porous electrode 110 includes the pattern layer, the distance between the porous electrode 110 and the separator 130 may indicate the shortest distance between the highest position of the pattern of the porous electrode 110 and the highest position of the separator 130.

A conventional electrode structure is configured to include a pair of bipolar plates, a pair of felt electrodes between the bipolar plates, and a separator between the felt electrodes, and the total thickness (two bipolar plates: 6 mm, two felt electrodes: 6 mm, and a separator: 0.18 mm) thereof is 12.18 mm, thus resulting in a thick electrode structure.

However, according to the embodiment of the present invention, the electrode structure 110 is configured such that a bipolar plate and a felt electrode are provided in the form of a single thin-film electrode. Thus, even when the same separator is used, the total thickness (two porous electrodes: 0.4 mm, a flow gasket: 0.1 to 1 mm, and a separator: 0.18 mm) thereof is 1.58 mm, thus obtaining an electrode structure 100 much thinner than the conventional electrode structure. The volume thereof may also be decreased to 1/10 of that of the conventional electrode structure. Thereby, the performance of an electrochemical device including the electrode structure 110 of the present invention may be maximized, and the stack connection may be decreased, and thus the electrochemical device may be manufactured at low cost.

The porous electrode and the separator may be bonded to each other and thus provided in an integrated form.

The electrode structure in an integrated form in which the porous electrode and the separator are bonded to each other may be used for a fuel cell. In this case, the pattern layer of the porous electrode may be formed on the surface opposite the surface in contact with the separator.

According to an embodiment of the present invention, a method of manufacturing the electrode structure 100 may comprise forming a positive electrode, forming a negative electrode so as to face the positive electrode, and forming a separator between the positive electrode and the negative electrode. At least one of the positive electrode and the negative electrode may be manufactured by mixing a porous conductor and a binder to give a slurry (step a), forming the slurry into a film through casting or rolling and then drying the film (step b), and forming a pattern layer or a mesh layer on at least one surface of the dried film (step c).

The description of the porous conductor is the same as above.

The electrode thus manufactured may be an integrated porous electrode 110 that is able to simultaneously perform the functions both of a bipolar plate and of a felt electrode.

The preparation of the slurry may be carried out using any process typically useful in the art. For example, the slurry may be prepared in a manner in which the first conductive material and the second conductive material are mixed using a mixer, added with a binder and then stirred, but the present invention is not limited thereto. In the case where it is difficult to perform stirring due to the high viscosity of the binder, the aforementioned dispersion medium may be added, whereby the viscosity of the slurry may be appropriately adjusted.

The slurry may comprise, based on the total weight of the slurry, 30 to 70 wt % of the first conductive material, 0.2 to 25 wt % of the second conductive material, 3 to 25 wt % of the binder, and the remainder of a solvent. With regard to the solvent, the description of the dispersion medium as above may be applied without change.

The casting process may be performed using a drum-type casting machine, a band-type casting machine, or a spin coater, and the rolling process may be conducted using a roll press, but the present invention is not limited thereto.

For example, step b may be performed in a manner in which the slurry is cast or rolled on a graphite plate and a conductive plate. Specifically, the slurry is uniformly applied and cast on one surface of a piece of foil, and is also uniformly applied and cast on the remaining surface thereof, thus forming a film. Alternatively, the slurry may be prepared into a paste, which is then rolled using a roll press, resulting in a film.

In the drying process, the drying temperature may fall in the range of 30 to 200° C., and is specifically set to the range of 60 to 100° C. for the casting process, or the range of 100 to 200° C. for the rolling process. In the case where the casting process is applied, the slurry is uniformly applied and cast on one surface of a target, after which drying of the slurry may be further conducted.

Forming the pattern layer may be carried out in a manner in which a pattern layer including at least one recess or at least one protrusion is formed. The description of the pattern is the same as above.

Forming the pattern may be implemented through roll pressing, press compression or printing, but the present invention is not limited thereto. For example, a pattern is formed on a roll and the film is roll-pressed, thereby forming a pattern on the porous electrode 110. Alternatively, a pattern may be formed by forming a pattern on a typical plate and then compressing with a press, or by placing a mesh on one or both surfaces of the prepared film and then compressing with a press. Furthermore, a pattern may be directly printed on the film, thereby forming a pattern on the porous electrode 110. The mesh layer may be formed using a Teflon mesh or a conductive mesh.

The mesh layer may be formed by attaching the mesh to the film dried in step b through pressing. The mesh layer may have a thickness of 0.1 to 5 mm and a pore size of 0.0001 to 0.8 mm. The conductive mesh may be formed of at least one metal or a metal alloy of two or more selected from among silver (Ag), copper (Cu), aluminum (Al), gold (Au), nickel (Ni), titanium (Ti), molybdenum (Mo), tungsten (W), chromium (Cr) and platinum (Pt).

In the formation of the pattern, the molding temperature, pressure and patterning process are not limited, and any suitable process chosen by those skilled in the art may be implemented depending on the shape of the pattern formed on the porous electrode.

The thickness of the integrated porous electrode 110 thus manufactured may fall in the range of 0.01 mm to 2 mm. Here, the electrode thickness may indicate the thickness after the drying process.

In addition, an electrochemical device according to an embodiment of the present invention may be configured to include the electrode structure 100. The electrochemical device may be an aqueous or organic redox flow battery, a fuel cell, a flow capacitor, or a salinity gradient power generator.

The redox flow battery (FIG. 2B) may be configured to include a pair of end plates 1*a*, 1*b* having an electrolyte solution inlet and an electrolyte solution outlet, current collectors 2a, 2b respectively provided inside the end plates, and an electrode structure 100 provided between the current collectors 2a, 2b.

The electrode structure 100 includes a positive electrode, a negative electrode, and a separator 130 disposed between the positive electrode and the negative electrode, and at least one of the positive electrode and the negative electrode may be composed of a porous electrode 110. FIGS. 2A and 2B illustrate the positive electrode and the negative electrode, both of which are formed of a porous electrode 110. Provided on one or both surfaces of the porous electrode 110 may be a frame-shaped manifold 120. More specifically, a frame-shaped manifold may be provided on both surfaces of the porous electrode 110 included in the electrode structure 100, and the porous electrode 110 positioned inside the current collectors 2a, 2b may be provided with a manifold on the surface opposite the surface that is in contact with the current collector 2a, 2b.

The end plates 1a, 1b function to form an outer contour of the redox flow battery stack, and are disposed at the outermost positions, and each include an electrolyte solution inlet and an electrolyte solution outlet. The inlet and the outlet may be formed using a typical process of forming a path for feeding or discharging an electrolyte solution on a plate typically useful in the art. Although the electrolyte solution inlet and the electrolyte solution outlet are not depicted in the drawings, they are connected to a cathode electrolyte solution tank and an anode electrolyte solution tank, and a cathode electrolyte solution and an anode electrolyte solution may be circulated by the operation of a pump that is additionally provided.

The end plates 1a, 1b may be formed using an insulator. For example, the end plates 1a, 1b may be formed using a polymer such as polyethylene (PE), polypropylene (PP), polystyrene (PS) or polyvinyl chloride (PVC), but the present invention is not limited thereto, and preferably useful is polyvinyl chloride (PVC), taking into consideration price and ease of purchase.

The current collectors 2a, 2b are formed respectively inside the end plates 1a, 1b that are disposed at the outermost positions, and the current collectors 2a, 2b function as the electron transfer paths so as to receive electrons from the outside upon charging or send electrons to the outside upon discharging. Two current collectors 2a, 2b positioned at opposite ends have different electrodes.

The separator 130 functions to separate a cathode electrolyte solution and an anode electrolyte solution upon charging or discharging, and also to selectively transfer only ions upon charging or discharging.

The manifolds 21, 22 may be in a frame shape, and may have flow paths at one side or both sides thereof. The flow paths are a pathway for transferring the electrolyte solution, through which the cathode electrolyte solution or the anode electrolyte solution is transferred, and the shape of which may be variously changed. Furthermore, the manifolds 21, 22 may be provided with an inlet and an outlet that enable the cathode electrolyte solution or the anode electrolyte solution to be supplied to or discharged from the flow paths, and may be easily formed using any process typically useful in the art to which the present invention belongs.

Figure 6A:
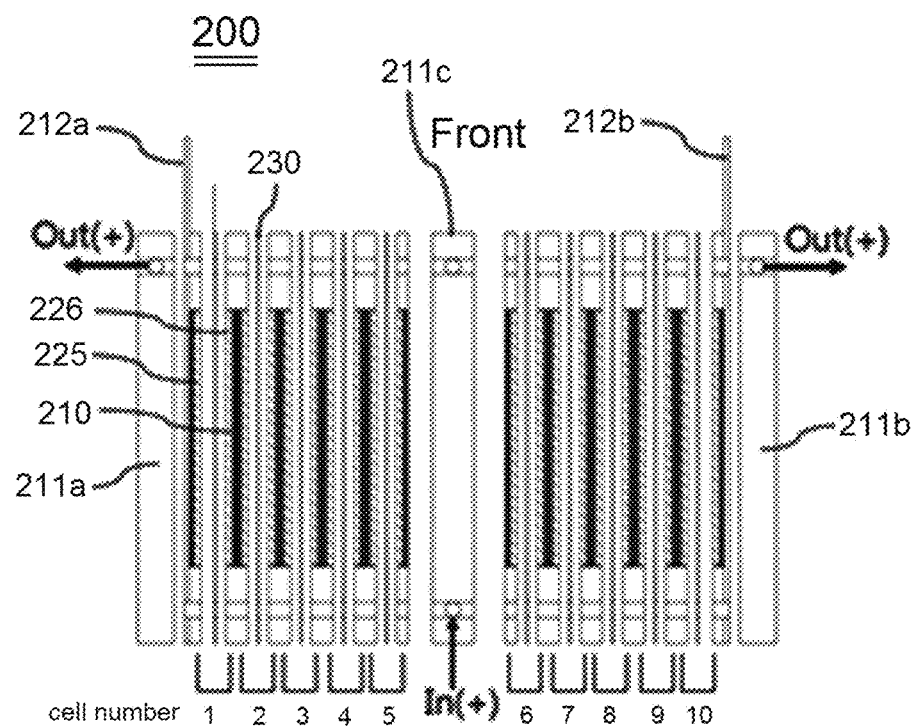
FIG. 6A schematically shows a redox flow battery stack configuration (a central distributed stack configuration) according to an embodiment of the present invention.
Figure 6A:
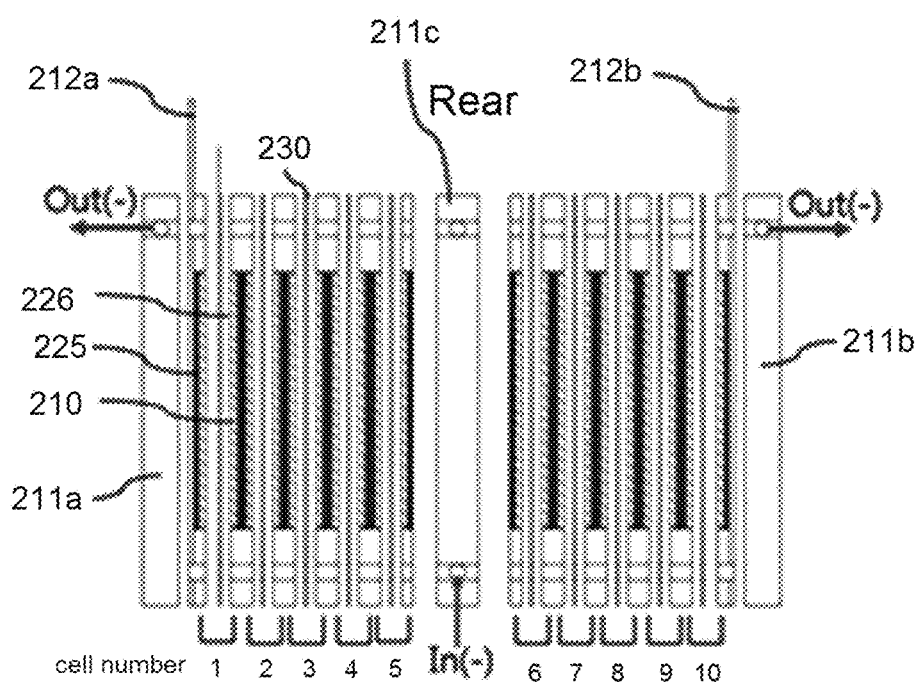

In addition, a redox flow battery stack configuration according to an embodiment of the present invention is formed such that a plurality of battery cells, each comprising a bipolar plate 210, a positive electrode plate 225, a negative electrode plate 226 and a separator 230, is stacked inside a pair of end plates 211a, 211b, and an anode electrolyte solution and a cathode electrolyte solution are alternately supplied to the stacked battery cells. Each of the pair of end plates 211a, 211b includes an electrolyte solution outlet, and a middle plate 211c having an electrolyte solution inlet may be disposed at the middle portion of the stacked battery cells. The electrolyte solution is supplied to the electrolyte solution inlet formed in the middle plate, and may then be discharged from the electrolyte solution outlet formed in the end plate (FIG. 6A).

The end plate may include an electrolyte solution outlet at each of the front and back surfaces thereof, and the middle plate may include an electrolyte solution inlet at each of the front and back surfaces thereof. The cathode electrolyte solution or the anode electrolyte solution is supplied to the front surface of the middle plate, and an electrolyte solution having a polarity opposite that of the front surface may be supplied to the back surface of the middle plate. Specifically, the cathode electrolyte solution supplied through the electrolyte solution inlet in the front surface of the middle plate is discharged from the electrolyte solution outlet in the front surface of the end plate, and the anode electrolyte solution supplied through the electrolyte solution inlet in the back surface of the middle plate may be discharged from the electrolyte solution outlet in the back surface of the end plate (FIG. 6A).

The redox flow battery configuration may be formed such that the electrolyte solution supplied through the electrolyte solution inlet in the middle plate 211c is transferred toward the left and right sides thereof.

Figure 5A:
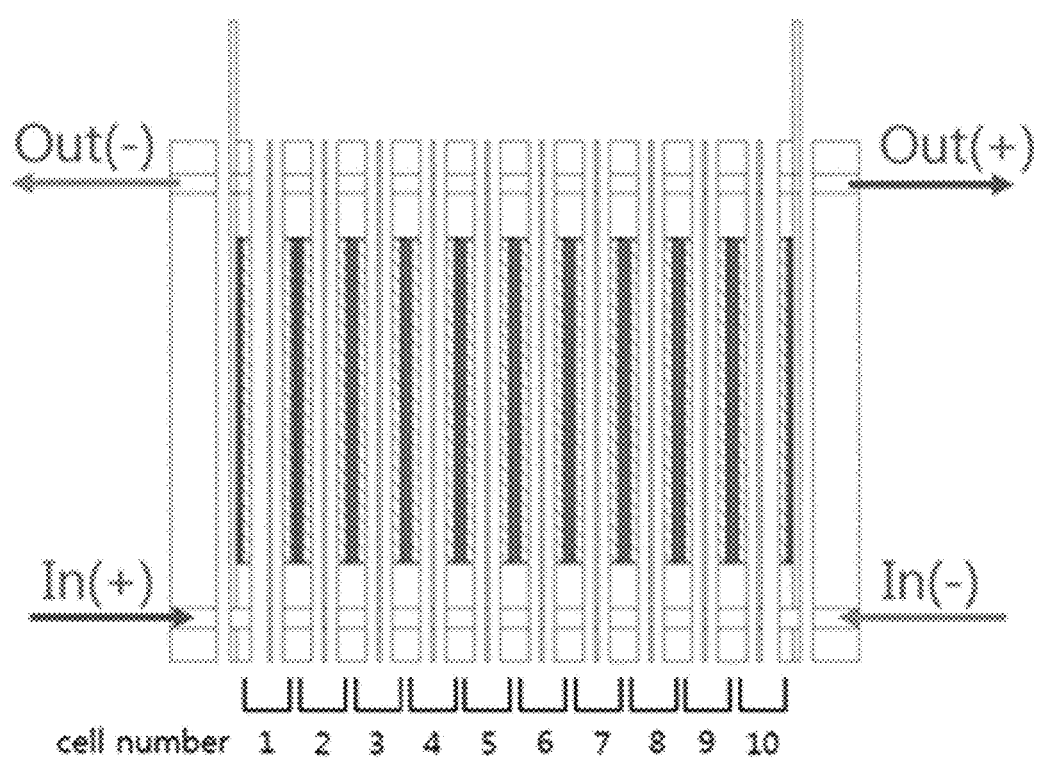
FIG. 5A shows a conventional redox flow battery stack configuration.
Figure 5B:
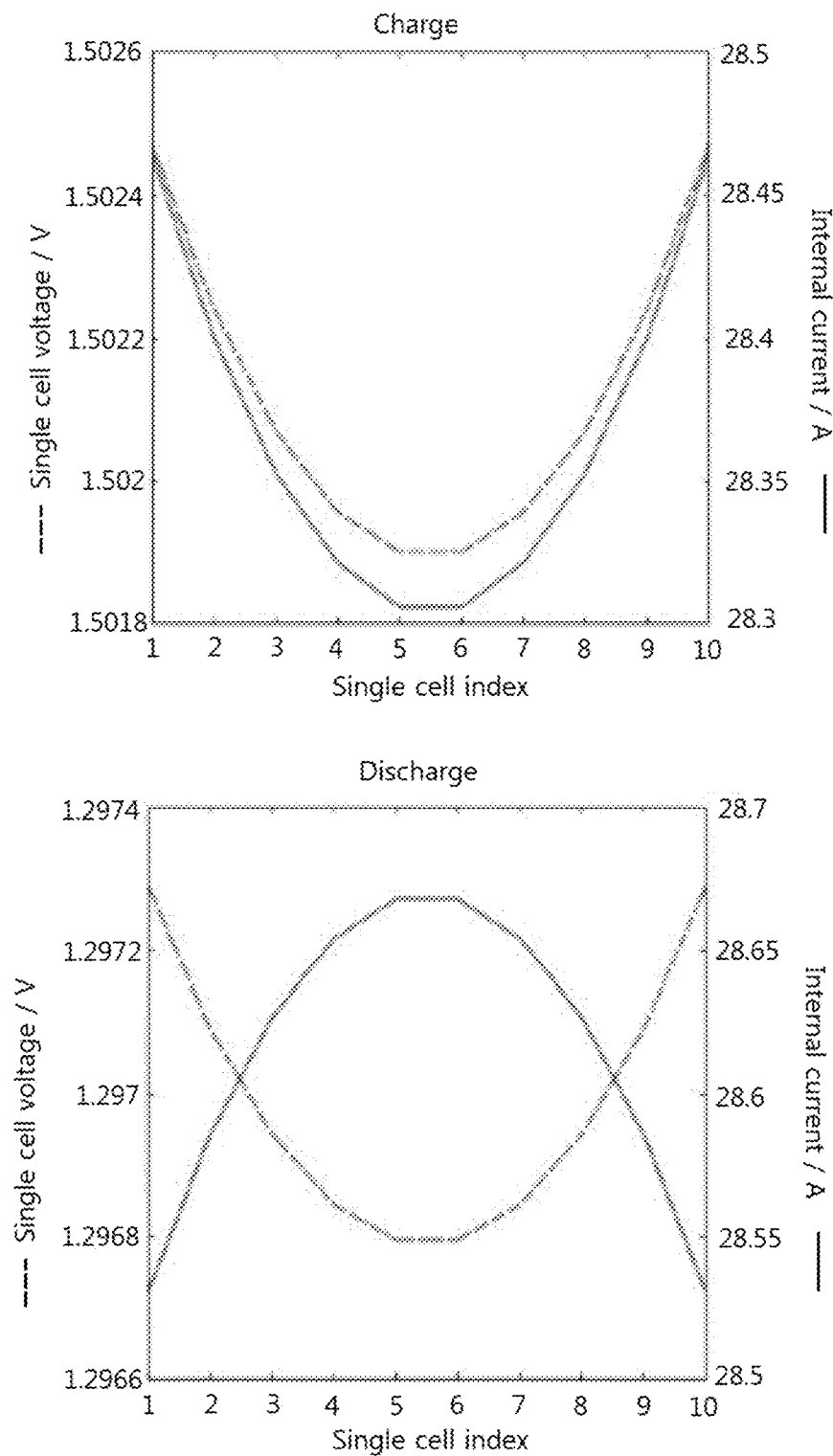
FIG. 5B shows graphs of the voltage and current gradients of the redox flow battery having the configuration of FIG. 5A.

As shown in FIG. 5A, a typical redox flow battery (RFB) is configured such that an electrolyte solution inlet is formed in an end plate and an electrolyte solution is transferred from the inlet using a pump. The electrolyte solution is transferred through a flow path, and is discharged through an electrolyte solution outlet in the opposite outermost position to thus be moved to an electrolyte solution tank. Here, the difference in voltage between the internal cells is increased in proportion to the increase in the number of cells that are stacked. As illustrated in FIG. 5B, U-shaped voltage and current gradients may occur depending on the number of cells that are actually stacked. When current is applied through the current collectors at both outermost positions, the reaction rate is lower at the middle portion than at the outermost positions and pressure dropping may occur at the middle portion when the electrolyte solution is transferred. Accordingly, greater U-shaped pressure and current gradients may be formed with an increase in the number of cells that are stacked, and cells are charged using energy higher than average voltage in order to increase voltage. In such a conventional stack configuration, the above problems may cause over-voltage and over-current of the stack, and cells may be aged due to the over-voltage and over-current, thus increasing shunt current due to the current distribution, undesirably lowering current efficiency.

According to an embodiment of the present invention, the redox flow battery configuration (FIG. 6A) is proposed to solve the aforementioned problems.

Figure 6B:
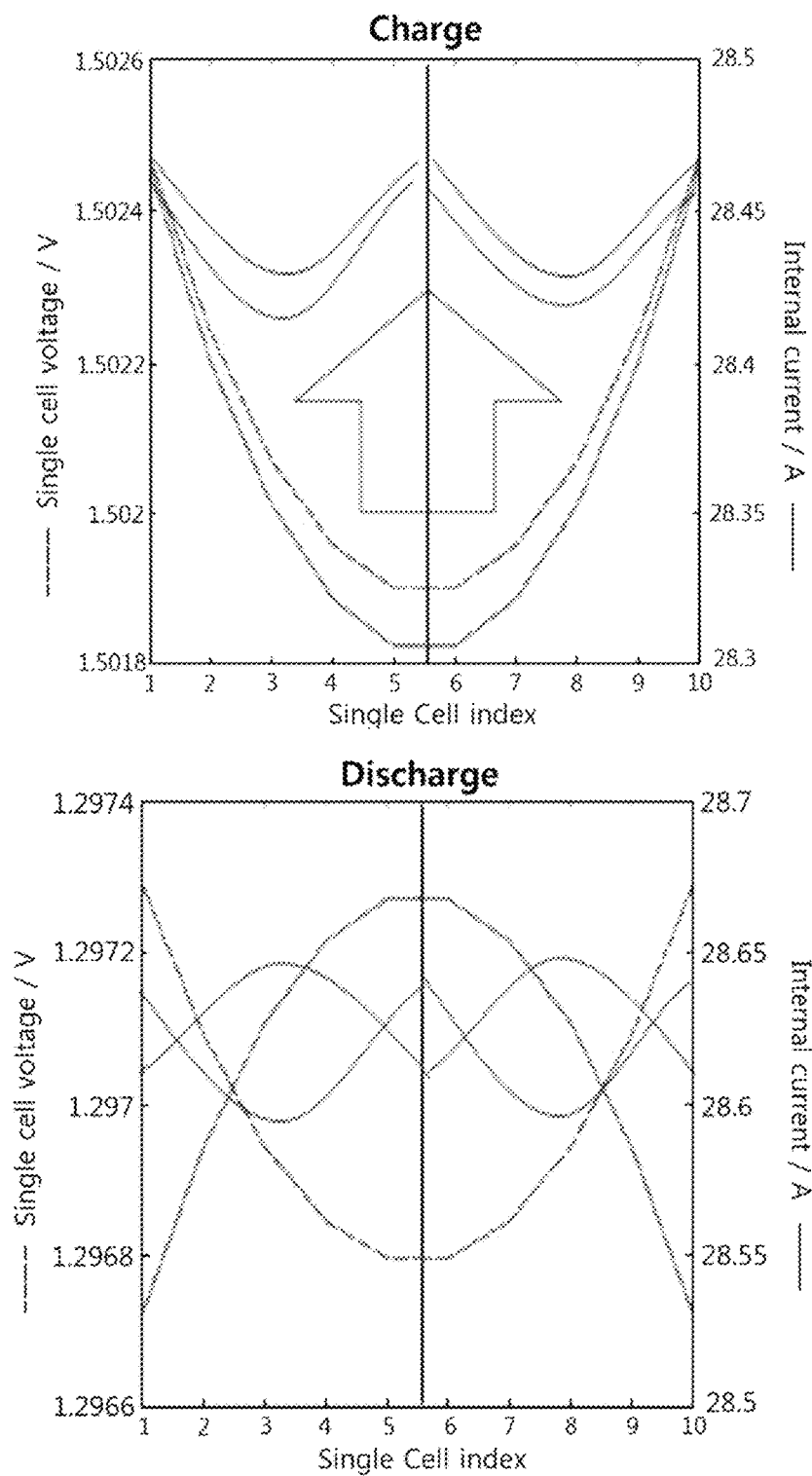
FIG. 6B shows graphs of the voltage and current gradients of the redox flow battery having the configuration of FIG. 5A and the redox flow battery having the configuration of FIG. 6A.

In an embodiment of the present invention, as shown in FIG. 6A, the electrolyte solution inlet is formed at the middle portion of the stack, whereby the electrolyte solution is transferred to the left side and the right side from the middle portion of the stack. Accordingly, the transfer distance is shortened by about ½ compared to the configuration of FIG. 5A, thus reducing the pressure dropping in the middle portion, and the shortened transfer distance enables the voltage and current distribution between the cells to be uniform, resulting in lower U-shaped voltage and current gradients (FIG. 6B). Briefly, as the difference in voltage and current between the cells that constitute the stack may decrease, pressure dropping and shunt current are lowered, ultimately improving cell performance and durability.

Figure 7A:
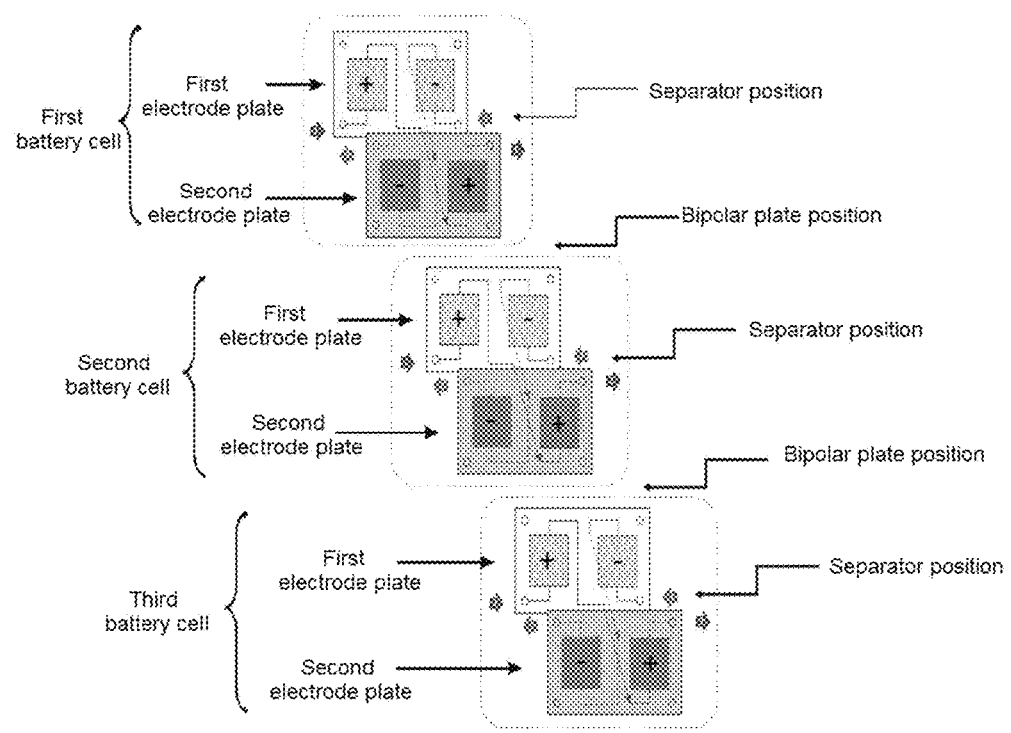
FIGS. 7A to 7D schematically show redox flow battery stack configurations according to embodiments of the present invention.

In addition, a redox flow battery configuration according to an embodiment of the present invention is formed such that a plurality of battery cells, each comprising a bipolar plate, a first electrode plate, a second electrode plate and a separator, is stacked inside a pair of end plates, and an anode electrolyte solution and a cathode electrolyte solution are individually supplied to the stacked battery cells. The first electrode plate is configured such that a single electrode plate includes a first positive electrode and a first negative electrode, and the second electrode plate is configured such that a single electrode plate includes a second positive electrode and a second negative electrode and is disposed so as to face the first electrode plate on the basis of the separator. Here, the electrolyte solution, which is introduced into the first positive electrode and allowed to react, is fed into the second positive electrode provided at the rear of the first negative electrode, and the electrolyte solution, which is introduced into the first negative electrode and allowed to react, is fed into the second negative electrode provided at the rear of the first positive electrode (FIG. 7A). In this configuration, the electrolyte solution that reacts at one electrode is transferred to another electrode at the rear thereof, thereby doubling the length of the flow path compared to the conventional case. In FIG. 7A, the arrows designate the directions of supply or discharge of the electrolyte solution.

Figure 7B:
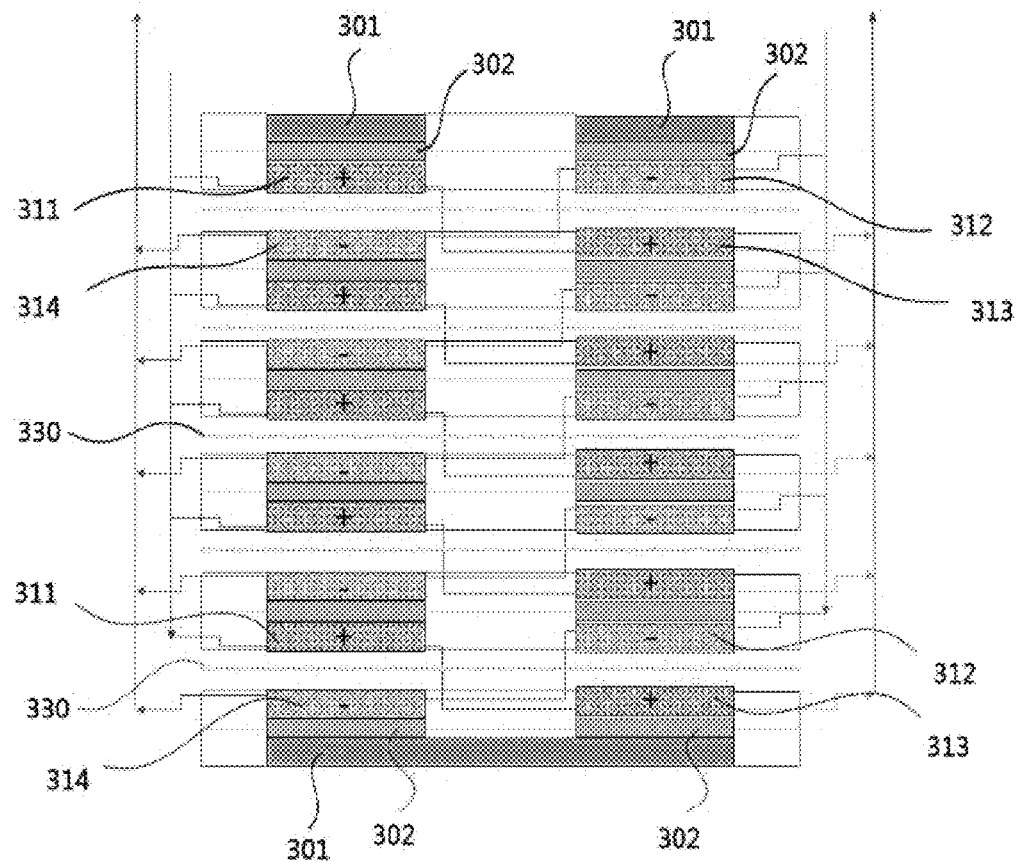

A separator 330 having through-holes therein may be disposed between the first electrode plate including the first positive electrode 311 and the first negative electrode 312 and the second electrode plate including the second positive electrode 313 and the second negative electrode 314. In this case, the electrolyte solution, which is introduced into the first positive electrode 311 and allowed to react, may be fed into the second positive electrode provided at the rear of the first negative electrode 312 through the through-holes in the separator, allowed to react and then discharged, and the electrolyte solution, which is introduced into the first negative electrode and allowed to react, may be fed into the second negative electrode provided at the rear of the first positive electrode through the through-holes in the separator, allowed to react, and then discharged (FIG. 7B).

Figure 7C:
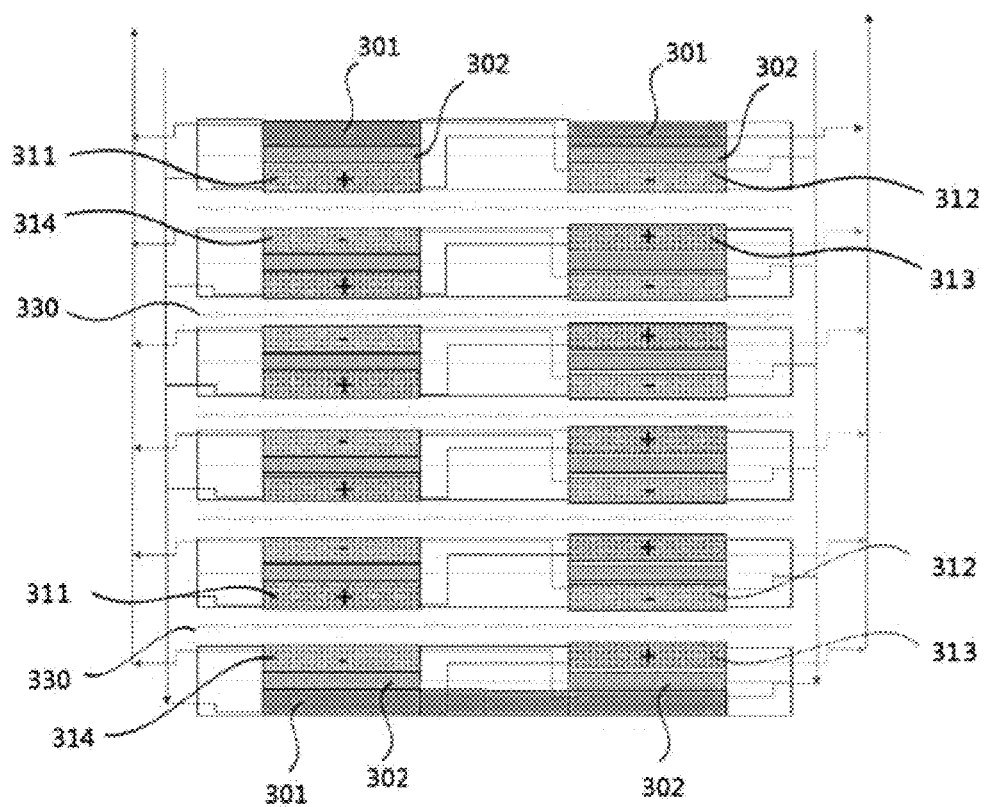

In addition, a redox flow battery stack configuration according to an embodiment of the present invention (FIG. 7C) is formed such that a plurality of battery cells, each comprising a bipolar plate 302, a first electrode plate, a second electrode plate and a separator, is stacked inside a pair of end plates 301, and an anode electrolyte solution and a cathode electrolyte solution are individually supplied to the stacked battery cells. The stacked battery cells comprise a first battery cell, a second battery cell, an n–1$^{th}$ battery cell and an n$^{th}$ battery cell, and each of the battery cells is configured such that the first electrode plate, the separator and the second electrode plate are sequentially disposed. The first electrode plate is configured such that a single electrode plate includes a first positive electrode 311 and a first negative electrode 312, and the second electrode plate is configured such that a single electrode plate includes a second positive electrode 313 and a second negative electrode 314 and is disposed so as to face the first electrode plate on the basis of the separator. In the first battery cell, the electrolyte solution introduced into the first positive electrode 311 and the electrolyte solution introduced into the first negative electrode 312 are individually allowed to react and then discharged, and the electrolyte solution, which is introduced into the first negative electrode of the second battery cell and allowed to react, is fed into the second negative electrode of the first battery cell, allowed to react and then discharged, and the electrolyte solution, which is introduced into the first positive electrode of the second battery cell and allowed to react, is fed into the second positive electrode of the first battery cell, allowed to react and then discharged. Furthermore, the electrolyte solution, which is introduced into the first positive electrode 311 of the n$^{th}$ battery cell and allowed to react, is fed into the second positive electrode of the n–1$^{th}$ battery cell, allowed to react and then discharged, and the electrolyte solution, which is introduced into the first negative electrode 312 of the n$^{th}$ battery cell and allowed to react, is fed into the second negative electrode of the n–1$^{th}$ battery cell, allowed to react and then discharged, and the electrolyte solution introduced into the second positive electrode 313 of the n$^{th}$ battery cell and the electrolyte solution introduced into the second negative electrode 314 thereof are individually allowed to react and then discharged.

Figure 7D:
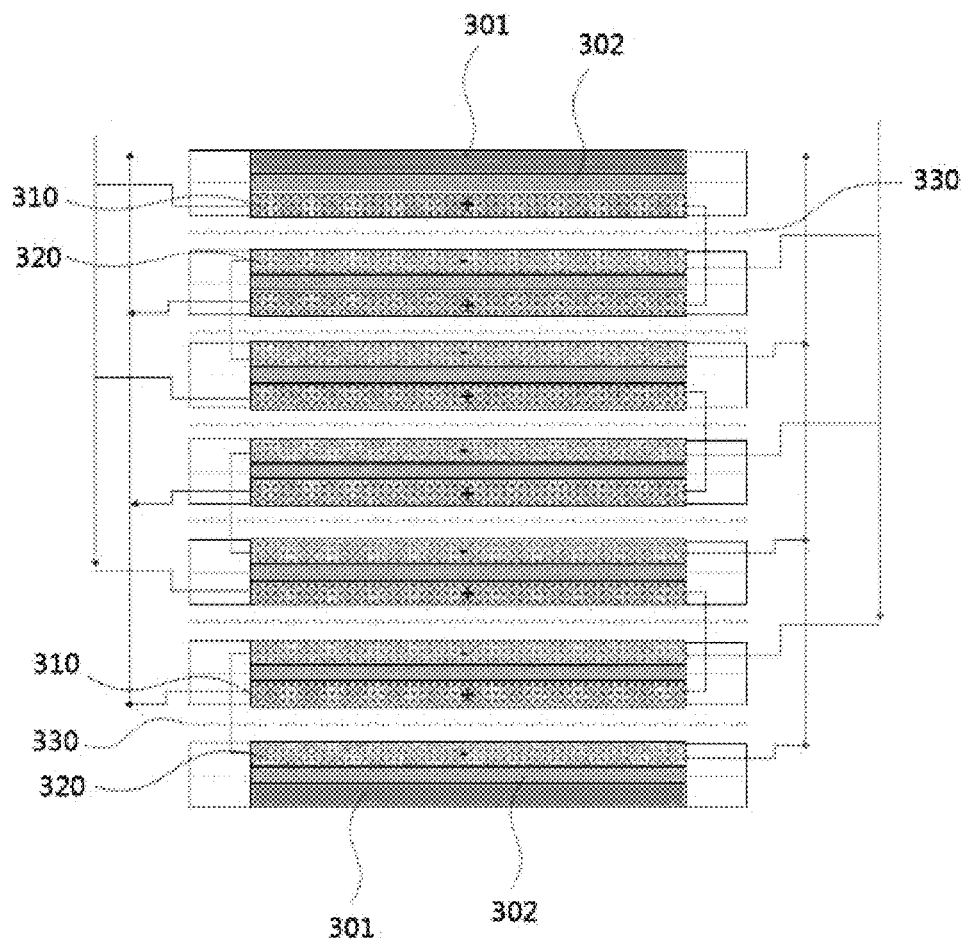

In addition, a redox flow battery stack configuration according to an embodiment of the present invention (FIG. 7D) is formed such that a plurality of battery cells, each comprising a bipolar plate 302, a positive electrode 310, a negative electrode 320 and a separator 330, is stacked inside a pair of end plates 301, and an anode electrolyte solution and a cathode electrolyte solution are individually supplied to the stacked battery cells. The stacked battery cells comprise a first battery cell, a second battery cell, . . . , an n–1$^{th}$ battery cell and an n$^{th}$ battery cell, and the separator has through-holes through which the electrolyte solution passes. The electrolyte solution, which is introduced into the positive electrode of the first battery cell and allowed to react, is fed into the positive electrode of the second battery cell through the through-holes in the separator 330, allowed to react and then discharged, and the electrolyte solution, which is introduced into the negative electrode of the first battery cell and allowed to react, is fed into the negative electrode of the second battery cell through the through-holes in the separator, allowed to react, and then discharged. The electrolyte solution, which is introduced into the positive electrode of the n–1$^{th}$ battery cell and allowed to react, is fed into the positive electrode of the n$^{th}$ battery cell through the through-holes in the separator, allowed to react and then discharged, and the electrolyte solution, which is introduced into the negative electrode of the n–1$^{th}$ battery cell and allowed to react, is fed into the negative electrode of the n$^{th}$ battery cell through the through-holes in the separator, allowed to react and then discharged.

In the redox flow battery stack configuration according to the embodiment of the present invention, the electrolyte solution, which reacts at one reaction electrode, is transferred to another reaction electrode at the rear thereof, and thus the number of nodes between the cells is decreased and the length of the flow path is doubled compared to the conventional case, thereby increasing the resistance of the electrolyte solution to thus drastically lower the shunt current caused by the flow path.

Examples 1 to 6: Formation of Porous Electrode 1

Activated carbon and acetylene black, having a specific surface area of 1,200 m$^2$/g or more, were mixed for 20 min using a mixer, and were further mixed with a PTFE binder for 30 min, thus preparing a slurry. Here, the amounts of activated carbon, acetylene black and PTFE, which were mixed, are shown in Table 1 below.

[Table 1]

TABLE 1

| | Porous conductor | | |
|---|---|---|---|
| | First conductive material Activated carbon | Second conductive material Acetylene black | Binder (PTFE) |
| Ex. 1 | 90 | 1.0 | 9.0 |
| Ex. 2 | 90 | 5.0 | 5.0 |
| Ex. 3 | 80 | 10.0 | 10.0 |
| Ex. 4 | 90 | 0.5 | 9.5 |
| Ex. 5 | 90 | — | 10.0 |
| Ex. 6 | 80 | 5.0 | 15.0 |

The prepared slurry was uniformly applied and cast on one surface of a piece of copper (Cu) foil having a thickness of 20 μm, and was then dried in an oven at 80° C. for 24 hr. Subsequently, the slurry was uniformly applied and cast on the remaining surface thereof, dried as above, and rolled using a roll press (at a pressure of 1,000 kgf/cm$^2$), thus forming a film 0.2 mm thick. Thereafter, the film was pressed while heat (80° C.) was applied using a mold having a chain-shaped pattern, thereby forming a patterned porous electrode.

Example 7: Formation of Porous Electrode 2

A slurry was prepared in the same manner as in Example 2, after which the prepared slurry was uniformly applied and cast on one surface of a piece of copper (Cu) foil having a thickness of 20 μm and then dried in an oven at 80° C. for 24 hr. Subsequently, the slurry was uniformly applied and cast on the remaining surface thereof, dried as above, and rolled using a roll press (at a pressure of 1,000 kgf/cm$^2$), thus forming a film 0.08 mm thick. Thereafter, the film was formed into a porous electrode having a pattern layer on the surface thereof using a plate and a Teflon mesh pattern so as to enable the efficient flow of fluid.

Example 8: Formation of Porous Electrode 3

A slurry was prepared in the same manner as in Example 2, after which the prepared slurry was uniformly applied and cast on one surface of a piece of aluminum (Al) foil having a thickness of 20 μm and then dried in an oven at 80° C. for 24 hr. Subsequently, the slurry was uniformly applied and cast on the remaining surface thereof, dried as above, and rolled using a roll press (at a pressure of 1,000 kgf/cm$^2$), thus forming a film 0.08 mm thick. Thereafter, the film was formed into a porous electrode having a pattern layer on the surface thereof using a plate and a Teflon mesh pattern so as to enable the efficient flow of fluid.

Test Example 1: Charge/Discharge Test 1

The charge/discharge characteristics of the porous electrode of Example 2 were measured. The thickness of the porous electrode used for testing was 0.2 mm, and the thickness of the electrode structure including the porous electrode was 0.6 mm. The electrode structure was provided between current collectors respectively disposed inside a pair of end plates, followed by charging and discharging. The separator was a cation exchange membrane, and 2 M VOSO$_4$ was dissolved in a 2 M sulfuric acid aqueous solution to give 45 ml of each of cathode and anode electrolyte solutions.

For charging and discharging, the charge voltage was 1.6 V, and the discharge voltage was 0.8 V. The results of charging and discharging are shown in Table 2 below. As seen in Table 2, an average current efficiency of 88.26%, a voltage efficiency of 84.5%, an energy efficiency of 74.5%, and a low cell resistance of 0.1 ohm were exhibited.

TABLE 2

| Cycle | Discharge capacity (mAh) | Charged energy (Wh) | Discharged energy (Wh) | Current efficiency (%) | Energy efficiency (%) | Voltage efficiency (%) | Resistance (ohm) |
|---|---|---|---|---|---|---|---|
| 1 | 906.4 | 1.548 | 1.137 | 87.7 | 73.4 | 83.7 | 0.12 |
| 2 | 866.9 | 1.447 | 1.086 | 90.2 | 75.0 | 83.2 | 0.11 |
| 3 | 936.2 | 1.562 | 1.190 | 89.6 | 76.2 | 85.0 | 0.11 |
| 4 | 928.5 | 1.586 | 1.180 | 86.9 | 74.4 | 85.7 | 0.10 |
| 5 | 862.6 | 1.477 | 1.090 | 86.9 | 73.8 | 84.9 | 0.10 |

Test Example 2: Charge/Discharge Test 2

The charge/discharge characteristics of the porous electrode of Example 7 were measured. The results thereof are shown in Table 3 below. The analysis thereof was the same as in Test Example 1.

TABLE 3

| Cycle | Discharge capacity (mAh) | Charged energy (Wh) | Discharged energy (Wh) | Current efficiency (%) | Energy efficiency (%) | Voltage efficiency (%) | Power output (W) | Resistance (ohm) |
|---|---|---|---|---|---|---|---|---|
| 1 | 862.7 | 0.9 | 1.0 | 94.5 | 72.2 | 76.4 | 0.3468 | 0.35 |
| 2 | 825.7 | 0.8 | 0.9 | 95.0 | 71.1 | 74.8 | 0.3417 | 0.39 |
| 3 | 853.8 | 0.9 | 1.0 | 95.5 | 71.0 | 74.4 | 0.3407 | 0.41 |
| 4 | 992.9 | 1.0 | 1.1 | 93.4 | 69.3 | 74.2 | 0.3100 | 0.40 |
| 5 | 884.5 | 0.9 | 1.0 | 91.2 | 64.5 | 70.7 | 0.3251 | 0.48 |

Test Example 3: Charge/Discharge Test 3

The charge/discharge characteristics of the porous electrode of Example 8 were measured. The results thereof are shown in Table 4 below. The analysis thereof was the same as in Test Example 1.

TABLE 4

| Cycle | Discharge capacity (mAh) | Charged energy (Wh) | Discharged energy (Wh) | Current efficiency (%) | Energy efficiency (%) | Voltage efficiency (%) | Power output (W) | Resistance (ohm) |
|---|---|---|---|---|---|---|---|---|
| 1 | 1157.7 | 1.2 | 1.4 | 86.5 | 68.5 | 79.2 | 0.1791 | 0.65 |
| 2 | 1122.0 | 1.1 | 1.3 | 86.2 | 68.2 | 79.1 | 0.1793 | 0.67 |
| 3 | 1075.4 | 1.1 | 1.3 | 86.4 | 67.4 | 78.1 | 0.1781 | 0.68 |
| 4 | 991.1 | 1.0 | 1.2 | 85.4 | 66.3 | 77.6 | 0.1773 | 0.72 |
| 5 | 975.9 | 1.0 | 1.2 | 84.0 | 65.5 | 77.9 | 0.1782 | 0.69 |

Although specific embodiments of the present invention have been disclosed in detail as described above, it is obvious to those skilled in the art that such description is merely of preferable exemplary embodiments and is not to be construed to limit the scope of the present invention. Therefore, the substantial scope of the present invention will be defined by the appended claims and equivalents thereof.

What is claimed is:

1. A porous electrode; comprising a porous conductor and a binder and having a pattern layer or a mesh layer formed on at least one surface thereof,
   wherein the pattern layer or the mesh layer functions as a flow path of an electrolyte solution,
   wherein the porous electrode is an integrated electrode that simultaneously performs functions of both a bipolar plate and a felt electrode,
   wherein the porous conductor comprises:
   a first conductive material having a porous structure; and
   a second conductive material including at least one selected from the group consisting of a carbon-based material, a metal, and a metal coated with a carbon-based material, and
   wherein the first conductive material has a specific surface area of 500 $m^2$/g to 3000 $m^2$/g.

2. An electrode structure; comprising:
   a positive electrode;
   a negative electrode disposed so as to face the positive electrode; and
   a separator disposed between the positive electrode and the negative electrode,
   wherein at least one of the positive electrode and the negative electrode is a porous electrode comprising a porous conductor and a binder, the porous electrode having a pattern layer or a mesh layer formed on at least one surface thereof,
   wherein the pattern layer or the mesh layer functions as a flow path of an electrolyte solution,
   wherein the porous electrode is an integrated electrode that simultaneously performs functions of both a bipolar plate and a felt electrode,
   wherein the porous conductor comprises:
   a first conductive material having a porous structure; and
   a second conductive material including at least one selected from the group consisting of a carbon-based material, a metal, and a metal coated with a carbon-based material, and
   wherein the first conductive material has a specific surface area of 500 $m^2$/g to 3000 $m^2$/g.

3. The electrode structure of claim 2, wherein the first conductive material includes any one or a mixture of two or more selected from the group consisting of activated carbon, graphite, carbon black, acetylene black, Denka black, Ketjen black, mesoporous carbon, graphene, a carbon nanotube, a carbon nanofiber, a carbon nanohorn, a carbon nanoring, a carbon nanowire, and fullerene.

4. The electrode structure of claim 2, wherein the second conductive material includes at least one selected from the group consisting of:
   a carbon-based material including any one or a mixture of two or more selected from the group consisting of activated carbon, graphite, carbon black, acetylene black, Denka black, Ketjen black, mesoporous carbon, graphene, a carbon nanotube, a carbon nanofiber, a carbon nanohorn, a carbon nanoring, a carbon nanowire, and fullerene;
   a metal including a single metal or a metal alloy of two or more selected from the group consisting of Cu, Al, Ti, Au, Pt, Fe, Ag, Si, Sn, Bi, Mg, Zn, In, Ge and Pb; and
   a metal coated with a carbon-based material.

5. The electrode structure of claim 2, wherein the binder includes at least one selected from the group consisting of polytetrafluoroethylene (PTFE), polyvinylidene fluoride (PVDF), carboxymethylcellulose (CMC), polyvinyl alcohol (PVA), polyvinyl butyral (PVB), polyvinyl pyrrolidone (PVP), polyethylene (PE), molasses, and styrene butadiene rubber (SBR).

6. The electrode structure of claim 2, wherein the porous electrode comprises, based on a total weight of the porous electrode:
   40 to 90 wt % of the first conductive material;
   0.3 to 30 wt % of the second conductive material; and
   1 to 30 wt % of the binder.

7. The electrode structure of claim 2, wherein the pattern layer includes a patterned portion and a non-patterned portion,
   the patterned portion includes a pattern having at least one recess or at least one protrusion,
   the non-patterned portion is provided on an outer part of the porous electrode on the surface of the porous electrode, and
   the patterned portion is provided on an inner part of the porous electrode on the surface of the porous electrode.

8. The electrode structure of claim 7, wherein a pattern closest to the non-patterned portion has a thickness of 0.5 times to less than 1 times or of 2 times or less but exceeding 1 times a thickness of the non-patterned portion.

9. The electrode structure of claim 7, wherein the non-patterned portion has a width variation of zero.

10. The electrode structure of claim 2, wherein the porous electrode has a thickness of 0.01 mm to 2 mm.

11. The electrode structure of claim 2, wherein the electrode structure has a thickness of 0.025 mm to 5 mm.

12. The electrode structure of claim 2, wherein a distance between the porous electrode and the separator is 0 to 3 mm.

13. An electrochemical device; comprising:
   an electrode structure configured to include a positive electrode, a negative electrode disposed so as to face the positive electrode, and a separator disposed between the positive electrode and the negative electrode, wherein at least one of the positive electrode and the negative electrode is a porous electrode comprising a porous conductor and a binder, the porous electrode having a pattern layer or a mesh layer formed on at least one surface thereof, wherein the pattern layer or the mesh layer functions as a flow path of an electrolyte solution, wherein the porous electrode is an integrated electrode that simultaneously performs functions of both a bipolar plate and a felt electrode, wherein the porous conductor comprises:

a first conductive material having a porous structure; and a second conductive material including at least one selected from the group consisting of a carbon-based material, a metal, and a metal coated with a carbon-based material, and wherein the first conductive material has a specific surface area of 500 $m^2/g$ to 3000 wherein the first conductive material has a specific surface area of 500 $m^2/g$ to 3000 $m^2/g$.

* * * * *